United States Patent
Maurer et al.

(10) Patent No.: US 10,196,276 B2
(45) Date of Patent: Feb. 5, 2019

(54) SYNTHESIS OF A BORON-CONTAINING ZEOLITE WITH AN MWW FRAMEWORK STRUCTURE

(71) Applicant: BASF SE, Ludwigshafen (DE)

(72) Inventors: Stefan Maurer, Shanghai (CN); Andrei-Nicolae Parvulescu, Ruppertsberg (DE); Ulrich Mueller, Neustadt (DE); Xiangju Meng, Hangzhou (CN); Feng-Shou Xiao, Changchun (CN); Yeqing Wang, Hangzhou (CN)

(73) Assignee: BASF SE, Ludwigshafen (DE)

( * ) Notice: Subject to any disclaimer, the term of this patent is extended or adjusted under 35 U.S.C. 154(b) by 23 days.

(21) Appl. No.: 15/316,220

(22) PCT Filed: Jun. 3, 2015

(86) PCT No.: PCT/EP2015/062385
§ 371 (c)(1),
(2) Date: Dec. 5, 2016

(87) PCT Pub. No.: WO2015/185633
PCT Pub. Date: Dec. 10, 2015

(65) Prior Publication Data
US 2018/0134570 A1    May 17, 2018

(30) Foreign Application Priority Data

Jun. 6, 2014  (EP) ..................................... 14171555
Oct. 29, 2014 (WO) ................ PCT/CN2014/089783

(51) Int. Cl.
| | | |
|---|---|---|
| C01B 39/48 | (2006.01) |
| C01B 39/12 | (2006.01) |
| B01D 15/36 | (2006.01) |
| B01D 53/86 | (2006.01) |
| B01J 20/18 | (2006.01) |
| B01J 29/86 | (2006.01) |

(52) U.S. Cl.
CPC ............ *C01B 39/48* (2013.01); *B01D 15/361* (2013.01); *B01D 53/86* (2013.01); *B01J 20/18* (2013.01); *B01J 29/86* (2013.01); *C01B 39/12* (2013.01); *B01D 2255/50* (2013.01)

(58) Field of Classification Search
CPC ................................. C01B 39/48; C01B 39/12
See application file for complete search history.

(56) References Cited

U.S. PATENT DOCUMENTS

| | | | |
|---|---|---|---|
| 4,954,325 A | 9/1990 | Rubin et al. | |
| 4,992,615 A | 2/1991 | Huss, Jr. et al. | |
| 5,107,047 A | 4/1992 | Del Rossi et al. | |
| 5,173,281 A | 12/1992 | Chang et al. | |
| 5,284,643 A | 2/1994 | Morrison et al. | |
| 5,382,742 A | 1/1995 | Morrison et al. | |
| 2008/0027260 A1 | 1/2008 | Lai et al. | |
| 2010/0260665 A1* | 10/2010 | Archer | C01B 37/007 |
| | | | 423/706 |
| 2014/0128622 A1* | 5/2014 | Vautravers | B01J 23/00 |
| | | | 549/272 |
| 2017/0001873 A1* | 1/2017 | Yang | C01B 39/48 |

FOREIGN PATENT DOCUMENTS

| | | |
|---|---|---|
| CN | 101384367 A | 3/2009 |
| CN | 102351210 A | 2/2012 |
| CN | 102874834 A | 1/2013 |
| EP | 0 293 032 A2 | 11/1988 |
| WO | WO 2007/094937 A1 | 8/2007 |
| WO | WO 2008/013644 A1 | 1/2008 |

OTHER PUBLICATIONS

International Search Report and Written Opinion dated Jul. 3, 2015 in PCT/EP2015/062385.
Stephen L. Lawton, et al., "Zeolite MCM-49: A Three-Dimensional Mcm-22 Analogue Synthesized by in Situ Crystallization" J. Phys. Chem. , vol. 100, No. 9, XP002526409,Feb. 29, 1996, pp. 3788-3798.
S. I. Zones, et al., "Synthesis of High Silica Zeolites Using a Mixed Quaternary Ammonium Cation, Amine Approach: Discovery of Zeolite SSZ-47" Chem. Mater. , vol. 14, No. 1, XP001092671, Jan. 1, 2002, pp. 313-320.
Michael E. Leonowicz, et al., "MCM-22: A Molecular Sieve with Two Independent Multidimensional Channel Systems" Science, vol. 264, Jun. 24, 1994, Downloaded from http://science.sciencemag.org/content/264/5167/1910 on Nov. 30, 2016, pp. 1910-1913.

* cited by examiner

*Primary Examiner* — David M Brunsman
(74) *Attorney, Agent, or Firm* — Oblon, McClelland, Maier & Neustadt, L.L.P.

(57) ABSTRACT

The present invention relates to a process for the production of a boron-containing zeolitic material having an MWW framework structure comprising $YO_2$ and $B_2O_3$, wherein Y stands for a tetravalent element, wherein said process comprises (a) providing a mixture comprising one or more sources for $YO_2$, one or more sources for $B_2O_3$, one or more organotemplates, and seed crystals, (b) crystallizing the mixture obtained in (a) for obtaining a layered precursor of the boron-containing MWW-type zeolitic material, (c) calcining the layered precursor obtained in (b) for obtaining the boron-containing zeolitic material having an MWW framework structure, wherein the one or more organotemplates have the formula (I): $R^1R^2R^3N$, wherein $R^1$ is ($C_5$-$C_8$) cycloalkyl, and wherein $R^2$ and $R^3$ are independently from each other H or alkyl, as well as to a synthetic boron-containing zeolite which is obtainable and/or obtained according to the inventive process as well as to its use.

14 Claims, 12 Drawing Sheets

SYNTHESIS OF A BORON-CONTAINING ZEOLITE WITH AN MWW FRAMEWORK STRUCTURE

The present invention relates to a synthetic process for the production of a boron-containing zeolitic material having an MWW framework structure. Specifically, the present synthetic process involves the use of a combination of specific organotemplates and seed crystals in the reactant mixture. The present invention also relates to the boron-containing zeolitic Jo material having an MWW framework structure obtained or obtainable by said synthetic process and to its use in various applications, and in particular in catalysis.

INTRODUCTION

Zeolites are microporous crystalline solids which are characterized by a well-defined pore or cavity or channel structure of molecular dimensions. Zeolites have been widely used in petro-chemistry (e.g., fluid catalytic cracking and hydrocracking), ion-exchange (e.g., water softening and purification), and in the separation and removal of gases and solvents. The industrial application value of a zeolite is generally associated with its structure uniqueness as well as the production cost of the zeolite. Notably, some zeolitic materials, for example, with an MFI, FAU, or MOR framework structure, have been found to be very versatile in industrial applications, since the chemical properties of such zeolites can be tuned for meeting different requirements.

Among the zeolitic frameworks discovered in recent years, the MWW structure has attracted considerable attention in both academic research and practical applications. The MWW framework structure is characterized by two independent pore systems. Specifically, one pore system comprises two-dimensional sinusoidal 10-member ring (10-MR) channels with an elliptical ring cross section of 4.1 Å×5.1 Å. The other pore system comprises large 12-MR super-cages connected by 10-MR windows. More structural details of the MWW framework structure were described by M. E. Leonowicz et al. in Science, vol. 264 (1994), pages 1910-1913. Besides said unique structural features, it is also noted that MWW zeolites are usually synthesized by first forming layered precursors intercalated with organic template molecules after a crystallization process. Upon a further calcination, the dehydroxylation and condensation between the two dimensional layered precursors lead to the formation of the zeolitic product with a three-dimensional MWW framework.

Owing to the unique combination of 10-MR and 12-MR channel systems, MWW zeolites, in particular aluminosilicate MCM-22, have been investigated as shape selective catalysts for hydrocarbon conversions, also as adsorbents for separation and purification processes in the petroleum, petrochemical and refining industries. For example, U.S. Pat. No. 5,107,047 discloses the application of zeolite MCM-22 for isomerization of olefins. Similarly, U.S. Pat. No. 4,992,615 discloses alkylation of iso- and ethyl benzene in liquid phase by alkylation of benzene with propylene.

The synthesis of zeolite MCM-22 has already been extensively investigated. For example, U.S. Pat. No. 4,954,325 discloses the synthesis of zeolite MCM-22 using hexamethyleneimine as an organotemplate under hydrothermal conditions at a temperature in the range of 80-225° C. for 24 hours to 60 days.

However, the disadvantage of using hexamethyleneimine as an organotemplate is that hexamethyleneimine is highly toxic and expensive, which render it unsuitable for a large scale synthesis of MWW zeolites including MCM-22.

CN 1789126 A discloses the use of a mixture of two types of organotemplates for the synthesis of zeolite MCM-22, one organotemplate being hexamethyleneimine, the other one being one selected from the group consisting of cyclohexylamine, butylamine and isopropylamine. Said document further discloses that the use of two types of organotemplates can reduce the amount of hexamethyleneimine needed for the zeolite production, as well as reduce the crystallization period the synthetic process.

CN 102351210 A discloses the use of cyclohexylamine as an organotemplate for the synthesis of zeolite MCM-22 with different Si/Al ratios. In particular, a silica gel is used as the silica source, and sodium aluminate is used as the alumina source in the synthetic mixture. Said document further teaches that the zeolite MCM-22 synthesized by using cyclohexylamine as an organotemplate displays an improved reactivity and selectivity in an alkylation reaction between propylene and benzene, when compared to the zeolite MCM-22 synthesized with hexamethyleneimine.

In contrast to zeolite MCM-22 which comprises aluminum in its MWW framework structure, there are relatively few studies on the synthesis of boron-containing zeolites with an MWW framework structure.

EP 293,032 A2 discloses the synthesis of a zeolite containing oxides of silicon and boron by using piperidine or hexamethyleneimine as an organotemplate.

CN 102874834 A discloses the synthesis of an Si/B zeolite using diethyldimethylammonium hydroxide as an organotemplate.

U.S. Pat. No. 5,173,281 A relates to a method for preparing a synthetic crystalline material from a reaction mixture including an organic directing agent selected from a group of compounds including cyclopentyl-, cyclohexyl-, and cycloheptylamine.

U.S. Pat. No. 5,284,643 A, on the other hand, concerns a gallium-containing MCM-22 zeolite and to methods for its synthesis. Lawton et al. in *Journal of Physical Chemistry* 1996, vol. 100, no. 9, pp. 3788-3798 relates to a three-dimensional MCM-22 analogue synthesized by in situ crystallization. WO 2008/013644 A1 concerns an MCM-22 family molecular sieve composition, a method for its synthesis, as well as its us for hydrocarbon conversions.

Zones et al. in *Chemistry of Materials* 2002, vol. 14. no. 1, pp. 313-320 relates to the synthesis of high silica zeolites using a mixed quaternary ammonium cation, and in particular the synthesis of SSZ-47.

Although several processes exist for synthesizing boron-containing zeolites with an MWW framework structure, there still remains a need for developing new and/or alternative synthetic processes to obtain said zeolites, in particular new synthetic processes using inexpensive and low toxic organotemplates.

DETAILED DESCRIPTION

It is therefore an object of the present invention to provide an improved process for the synthesis of boron-containing zeolites having an MWW framework structure. It is also an object of the present invention to provide new boron-containing zeolite having an MWW framework structure with new and improved physical and chemical properties.

Thus, it has surprisingly been found that by using a combination of one or more specific cycloalkylamine organotemplates and seed crystals in the reactant mixture, a boron-containing zeolite having an MWW framework structure can be obtained, such that a facile and inexpensive method for the production of such a material is provided which employs an organotemplate which is not only inexpensive but also in particular less critical with respect to health and safety issues compared to organotemplates currently employed in the art.

Moreover, it has also been found that the combination of the one or more specific cycloalkylamine organotemplates with the seed crystals is essential for a successful synthesis of the boron-containing zeolite having an MWW framework structure. Otherwise, neither the use of the one or more specific cycloalkylamine organotemplates but without any seed crystal, nor the use of seed crystals but without the one or more specific cycloalkylamine organotemplates, in the synthetic mixture would lead to the formation of a boron-containing zeolite having an MWW framework structure.

Therefore, the present invention relates to a process for the production of a boron-containing zeolitic material having an MWW framework structure comprising $YO_2$ and $B_2O_3$, wherein Y stands for a tetravalent element, wherein said process comprises
  (a) providing a mixture comprising one or more sources for $YO_2$, one or more sources for $B_2O_3$, one or more organotemplates, and seed crystals,
  (b) crystallizing the mixture obtained in (a) for obtaining a layered precursor of the boron-containing MWW-type zeolitic material,
  (c) calcining the layered precursor obtained in (b) for obtaining the boron-containing zeolitic material having an MWW framework structure,
wherein the one or more organotemplates have the formula (I)

$$R^1R^2R^3N \quad (I)$$

wherein $R^1$ is $(C_5-C_8)$cycloalkyl, and
wherein $R^2$ and $R^3$ are independently from each other H or alkyl.

According to the present invention, the MWW framework structure of the boron-containing zeolitic material comprises Y and oxygen, preferably in a form that the Y atoms are interconnected via oxygen. More preferably, the Y atoms are tetrahedrally coordinated and interconnected via oxygen in the MWW framework structure.

Concerning the Y element in the zeolitic material, no restriction applies according to the present invention as to the type or types of Y element which may be employed, provided that at least a portion thereof may be incorporated into the MWW framework structure as $YO_2$. Thus, any conceivable tetravalent element Y may be employed, wherein said element is preferably selected from the group consisting of Si, Sn, Ti, Zr, Ge and combinations of two or more thereof. Y is however more preferably Si and/or Ti, and is more preferably Si.

According to the present invention, boron is contained in the zeolitic material having an MWW framework, wherein boron is contained in the MWW framework structure of the zeolitic material.

Step (a)

According to step (a) of the present inventive process, one or more sources for $YO_2$ are comprised in the mixture of said step, Y being preferably selected from the group consisting of Si, Sn, Ti, Zr, Ge and combinations of two or more thereof, wherein Y is more preferably Si and/or Ti, and more preferably Si.

For the preferred embodiments wherein Y is Si in step (a), the one or more sources for $YO_2$ in the mixture are one or more sources for $SiO_2$.

Concerning the one or more sources for $SiO_2$ in the mixture of step (a), again no particular restriction applies in their respect provided that at least a portion of the $SiO_2$ contained therein or which may be provided by said source by appropriate chemical transformation thereof may be incorporated into the MWW framework structure as $SiO_2$. According to the present invention, said one or more sources of $SiO_2$ are preferably selected from the group consisting of silicas, silicates, silicic acid and combinations of two or more thereof, more preferably selected from the group consisting of silicas, alkali metal silicates, silicic acid, and combinations of two or more thereof, more preferably selected from the group consisting of fumed silica, silica hydrosol, colloidal silica, reactive amorphous solid silica, silica gel, pyrogenic silica, lithium silicates, sodium silicates, potassium silicates, silicic acid, and combinations of two or more thereof, more preferably selected from the group consisting of fumed silica, silica hydrosol, colloidal silica, silica gel, pyrogenic silica, sodium silicate, water glass, silicic acid, and combinations of two or more thereof, more preferably selected from the group consisting of fumed silica, silica hydrosol, colloidal silica, silica gel, pyrogenic silica, and combinations of two or more thereof, wherein more preferably the one or more sources for $SiO_2$ are silica hydrosol and/or colloidal silica. More preferably, colloidal silica is employed as the source for $SiO_2$ in the mixture of step (a).

According to step (a) of the present inventive process, one or more sources for $B_2O_3$ are comprised in mixture of said step. As to the one or more sources for $B_2O_3$ which may be employed according to the inventive process, again no particular restriction applies in their respect provided that at least a portion of the $B_2O_3$ contained therein or which may be provided by said source by appropriate chemical transformation thereof may be incorporated into the MWW framework structure as $B_2O_3$. According to the present invention, said one or more sources for $B_2O_3$ are preferably selected from the group consisting of boric acid, boron oxide, borates, borate esters, and combinations of two or more thereof, preferably selected from the group consisting of boric acid, boron oxide, orthoborates, diborates, triborates, tetraborates, trimethyl borate, triethyl borate, and combinations of two or more thereof, wherein more preferably the one or more sources for $B_2O_3$ are boron oxide and/or boric acid. More preferably, boric acid is employed as the source for $B_2O_3$ in the mixture of step (a).

As regards the amounts in which $YO_2$ and $B_2O_3$ may be employed in the inventive process, these may be used in any suitable amounts provided that a boron-containing zeolitic material may be obtained according to the inventive process in which both $YO_2$ and $B_2O_3$ are contained in the MWW framework structure of the resulting material. Thus, according to preferred embodiments of the present inventive process, the molar ratio $YO_2:B_2O_3$ of the one or more sources of $YO_2$ to the one or more sources for $B_2O_3$ in the mixture provided in step (a) is in the range of from 1:1 to 300:1, preferably from 1.2:1 to 100:1, more preferably from 1.4:1 to 50:1, more preferably from 1.6:1 to 20:1, more preferably from 1.8:1 to 10:1, more preferably from 2.0:1 to 8:1. More preferably, the molar ratio $YO_2:B_2O_3$ of the one or more sources of $YO_2$ to the one or more sources for $B_2O_3$ in the mixture provided in step (a) is in the range of from 2.1:1 to 7:1.

According to step (a) of the present inventive process, one or more organotemplates are comprised in the mixture of said step, wherein the one or more organotemplates have the formula (I)

$$R^1R^2R^3N \quad (I)$$

wherein $R^1$ is $(C_5$-$C_8)$cycloalkyl, and
wherein $R^2$ and $R^3$ are independently from each other H or alkyl.

Concerning group $R^1$ in formula (I) of the one or more organotemplates, said group is preferably selected from the group consisting of substituted and/or unsubstituted cyclopentyl, cyclohexyl, cycloheptyl, and cyclooctyl, more preferably from the group consisting of substituted and/or unsubstituted cyclopentyl, cyclohexyl and cycloheptyl, wherein more preferably $R^1$ is substituted or unsubstituted cyclohexyl or cycloheptyl, more preferably substituted or unsubstituted cyclohexyl. More preferably, group $R^1$ in formula (I) of the one or more organotemplates is unsubstituted cyclohexyl.

Concerning groups $R^2$ and $R^3$ in formula (I) of the one or more organotemplates, said two groups are preferably, independently from each other, H or $(C_1$-$C_3)$ alkyl. More preferably, $R^2$ and $R^3$ are independently from each other selected from the group consisting of H, methyl, ethyl and propyl. More preferably, $R^2$ and $R^3$ in formula (I) of the one or more organotemplates are H.

According to the present inventive process, it is preferred that the one or more organotemplates in the mixture of step (a) are selected from the group consisting of substituted and/or unsubstituted $(C_5$-$C_8)$cycloalkylamines, preferably selected from the group consisting of substituted and/or unsubstituted cyclopentylamine, cyclohexylamine, cycloheptylamine, cyclooctylamine, and combinations of two or more thereof, more preferably substituted and/or unsubstituted cyclohexylamine and/or cycloheptylamine. More preferably, unsubstituted cyclohexylamine is the organotemplate in the mixture of step (a).

Concerning the amount of the one or more organotemplates which may be employed in the inventive process, no particular restriction applies such that any suitable amount may be used provided that a boron-containing zeolitic material having an MWW framework structure comprising $YO_2$ and $B_2O_3$ may be obtained. According to the present inventive process, it is however preferred that the molar ratio organotemplate:$YO_2$ of the one or more organotemplates to the one or more sources for $YO_2$ in the mixture provided in step (a) is in the range of from 0.02:1 to 10:1, preferably from 0.05:1 to 4:1, more preferably from 0.1:1 to 2:1, more preferably from 0.15:1 to 1:1, more preferably from 0.2:1 to 0.8:1, more preferably from 0.23:1 to 0.7:1, more preferably from 0.25:1 to 0.6:1, wherein the one or more organotemplates do not include organotemplate optionally contained in the seed crystals, wherein said one or more sources for $YO_2$ may include or not include the amount of $YO_2$ provided in the seed crystals in step (a), and preferably do not include the amount of $YO_2$ provided to the mixture by the seed crystals in step (a).

According the present inventive process, it is further preferred that the molar ratio $YO_2$:$B_2O_3$: organotemplate of the one or more sources of $YO_2$ to the one or more sources of $B_2O_3$ to the one or more organotemplates in the mixture provided according to step (a) is in the range of 1: (0.003-2):(0.02-10), preferably in the range of 1: (0.01-1.6):(0.05-4), more preferably in the range of 1: (0.02-1.3):(0.1-2), more preferably in the range of 1: (0.05-1):(0.15-1), more preferably in the range of 1: (0.1-0.8):(0.2-0.8), more preferably in the range of 1:(0.13-0.6):(0.23-0.7), more preferably in the range of 1: (0.14-0.48):(0.25-0.6), wherein the one or more organotemplates do not include the organotemplate optionally contained in the seed crystals, wherein said one or more sources for $YO_2$ may include or not include the amount of $YO_2$ provided by the seed crystals, wherein said one or more sources for $B_2O_3$ may include or not include the amount of $B_2O_3$ in the seed crystals when the seed crystals contain $B_2O_3$ in step (a). According to the present invention, it is preferred that the one or more sources for $YO_2$ do not include the amount of $YO_2$ provided to the mixture by the seed crystals in step (a), nor does the one or more sources of $B_2O_3$ include the amount of $B_2O_3$ which may be contained in the seed crystals in step (a).

According to step (a) of the present inventive process, seed crystals are comprised in the mixture of the said step. Concerning the type or types of seed crystals which may be employed in the inventive process, no particular restrictions apply such that any suitable material may be employed to this effect, provided that it may induce nucleation of the layered precursor of the boron-containing zeolitic material obtained in step (b), from which the zeolitic material having an MWW framework structure may then be obtained in step (c) after calcination thereof. It is, however, preferred according to the present invention that the seed crystals comprise one or more zeolitic materials, wherein independently from one another said one or more zeolitic materials preferably comprise $YO_2$ and $X_2O_3$ in their framework structure, wherein X is a trivalent element, and Y is a tetravalent element.

As regards the trivalent element X which may be contained as $X_2O_3$ in the one or more zeolitic materials preferably comprised in the seed crystals, no particular restrictions apply such that in principle any suitable trivalent element X may be employed, provided that it is contained as $X_2O_3$ in the zeolitic material's framework structure. It is, however, preferred according to the present invention, that the X element in the seed crystals is selected from the group consisting of Al, B, In, Ga, and combinations of two or more thereof, wherein more preferably the trivalent element comprises Al and/or B. More preferably, the trivalent element X in the seed crystals is B.

On the other hand and independently thereof, as regards the tetravalent element Y which may be contained as $YO_2$ in the one or more zeolitic materials preferably comprised in the seed crystals, no particular restrictions apply such that in principle any suitable tetravalent element Y may be employed, provided that it is contained as $X_2O_3$ in the zeolitic material's framework structure. It is, however, preferred according to the present invention, that the Y element in the seed crystals is selected from the group consisting of Si, Sn, Ti, Zr, Ge and combinations of two or more thereof, wherein more preferably the tetravalent element Y comprises Si and/or Ti. More preferably, the tetravalent element Y in the seed crystals is Si.

According to preferred embodiments of the present inventive process, no restriction applies as to the amount of seed crystals in the mixture provided in step (a). Thus, by way of example, the amount of seed crystals provided in (a) may range anywhere from 0.05 to 60 weight-% based on 100 weight-% of $YO_2$ in the one or more sources for $YO_2$, wherein preferably the amount of seed crystals ranges from 0.1 to 50 weight-%, more preferably from 0.2 to 35 weight-%, more preferably from 0.5 to 25 weight-%, more preferably from 1 to 20 weight-%, more preferably from 2 to 15 weight-%, more preferably from 4 to 12 weight-%. More preferably, the amount of seed crystals in the mixture provided in step (a) is in the range of from 5 to 10 weight-%.

Regarding the technical effect of the seed crystals for the present invention, it has surprisingly been found that in the case that no seed crystal is added into the synthetic mixture, an MWW zeolitic product can not be obtained under the conditions of crystallization according to step (b). Alternatively, the use of seed crystals without adding the one or more organotemplates does not lead to the formation of the MWW zeolitic product. Thus, it has quite unexpectedly been found that the presence of both the seed crystals and the one or more organotemplates is essential for the synthesis of the MWW zeolitic product.

According to the present invention, it is preferred that the seed crystals in the mixture of step (a) comprise a zeolitic material having an MWW framework structure and/or a layered precursor of a zeolitic material having an MWW framework structure. More preferably, the seed crystals comprise a zeolitic material having an MWW framework structure which is obtained or obtainable according to the present inventive process, and/or a layered precursor which is obtained or obtainable according to step (b) of the present inventive process. Even more preferably, the seed crystals comprise a layered precursor which is obtained or obtainable according to step (b) of the present inventive process.

Within the meaning of the present invention, the term "layered precursor" with respect to the zeolitic material having an MWW framework structure refers to a material obtainable and/or obtained in the course of the synthesis of a zeolitic material having an MWW framework structure with the use of an organotemplate, wherein said precursor material is initially crystallized and forms layered precursors intercalated with the organic template molecules. From said layered precursor, the zeolitic material having an MWW framework structure may be obtained by dehydroxylation and condensation between the two-dimensional layered precursors leading to the formation of the three-dimensional MWW-framework. Typically, the dehydroxylation and condensation is achieved by thermal treatment of the layered precursor, in particular by calcination thereof, wherein said calcination may be conducted at a temperature in the range of anywhere from 300 to 900° C., more preferably from 400 to 700° C., more preferably from 450 to 650° C., and more preferably from 500 to 600° C.

As regards the chemical and/or physical properties of the seed crystals provided in step (a), no particular restrictions apply provided that the crystallization of a layered precursor of the boron-containing MWW-type zeolitic material in step (b) may be achieved. Thus, in instances wherein the seed crystals comprise a zeolitic material having an MWW framework structure and/or a layered precursor of a zeolitic material having an MWW framework structure, said layered precursor and/or zeolitic material is in principle not restricted with respect to its constituent components. According to the inventive process it is however preferred that the preferred layered precursor and/or zeolitic material of the seed crystals comprises $YO_2$ and $X_2O_3$, wherein Y is a tetravalent element and X is a trivalent element. More preferably, the layered precursor and/or zeolitic material comprises said $YO_2$ and $X_2O_3$ in its respective layered precursor and MWW framework structure.

With respect to the Y element in the preferred layered precursor and/or zeolitic material of the seed crystals, said element is preferably selected from the group consisting of Si, Sn, Ti, Zr, Ge and combinations of two or more thereof. More preferably, Y is Si for the preferred layered precursor and/or zeolitic material of the seed crystals.

With respect to the X element in the preferred layered precursor and/or zeolitic material of the seed crystals, said element is preferably selected from the group consisting of Al, B, In, Ga, and combinations of two or more thereof. More preferably, X is B and/or Al, more preferably B for the preferred layered precursor and/or zeolitic material of the seed crystals.

Concerning the $YO_2$:$X_2O_3$ molar ratio of the preferred layered precursor and/or zeolitic material of the seed crystals, no specific restrictions exist. Said $YO_2$:$X_2O_3$ molar ratio is, however, preferably in the range of 4 to 600, more preferably from 6 to 200, more preferably from 10 to 100, more preferably from 16 to 60, more preferably from 20 to 50, more preferably from 24 to 40. More preferably, the $YO_2$:$X_2O_3$ molar ratio of the preferred layered precursor and/or zeolitic material of the seed crystals is in the range of from 28 to 34.

Furthermore, it is preferred that the preferred layered precursor and/or zeolitic material of the seed crystals comprises one or more alkali metals M as respective extra-layered precursor or extra-framework ion. The one or more alkali metals M are preferably selected from the group consisting of Li, Na, K, Rb, Cs, and combinations of two or more thereof, more preferably Na and/or Li. More preferably, Na is the alkali metal in the preferred layered precursor and/or zeolitic material of the seed crystals.

According to the present invention it is preferred that the lattice parameter for the c-axis of the preferred zeolitic material of the seed crystals, as obtained from X-ray structure analysis, is in the range of from 25.0 to 27.8 Angstrom, and more preferably in the range of from 26.0 to 27.5 Angstrom, more preferably from 26.5 to 27.2 Angstrom, more preferably from 26.8 to 27.1 Angstrom, and more preferably from 26.9 to 27.05 Angstrom. According to the present invention it is particularly preferred that the lattice parameter of the c-axis of the preferred layered zeolitic material of the seed crystals is in the range of from 26.99 to 27.03 Angstrom.

Concerning the seed crystals, in instances wherein the seed crystals contain one or more zeolitic materials, there is no restriction as to whether said seed crystals contain an organotemplate or not, depending on whether an organotemplate was employed in the preparation of the one or more zeolitic materials. Therefore, the seed crystals can principally be used in an uncalcined form which contains an organotemplate, or in a calcined form which does not contain organotemplates due to the calcination conditions under which the organotemplates are burned out of the seed crystals.

According to the present inventive process, apart from the one or more organotemplates provided in (a), there is principally no restriction as to further organotemplates which may be contained in the mixture provided therein. Thus, any further suitable further organotemplate or organotemplates may be provided in step (a), provided that a layer precursor of the boron-containing zeolitic material may be obtained in (b) and a zeolitic material having an MWW framework structure may be obtained in (c) after calcination thereof. Besides the addition of one or more further organotemplates as such, said one or more further organotemplates may independently thereof also be provided via the seed crystals. It is, however, preferred according to the present invention that apart from organotemplate optionally contained in the seed crystals, the mixture provided according to step (a) does not contain piperidine or hexamethyleneimine, preferably does not contain both piperidine and hexamethyleneimine, and more preferably does not contain $(C_4$-$C_7)$alkyleneimines and $(C_5$-$C_8)$alkylamines other than the one or more organotemplates according to formula (I), and more preferably does not contain alkyleneimines and alkylamines other than the one or more organotemplates according to formula (I). According to the present invention it is particularly preferred that the mixture provided in (a) does not contain any further organotemplates than the one or more organotemplates according to formula (I), including organotemplates optionally present in the seed crystals.

In principle, there is no restriction as to further components which may be provided in step (a) of the inventive process, provided that a layered precursor of the boron-containing zeolitic material may be obtained in (b) and subsequently a boron-containing zeolitic material having an MWW framework structure may be obtained in (c). Thus, by way of example, it is further preferred according to the present inventive process, that the mixture provided in step (a) comprises one or more sources for $M_2O$, wherein M stands for one or more alkali metals M. In this respect, the one or more alkali metals M are preferably selected from the group consisting of Li, Na, K, Rb, Cs, and combinations of two or more thereof, more preferably from the group consisting of Li, Na, Rb and combinations of two or more thereof, wherein more preferably the one or more alkali metals M are Li and/or Na. More preferably, the mixture provided in step (a) of the present inventive process comprises one or more sources of $Na_2O$. Within the meaning of the present invention, the term "$M_2O$" does not refer to the oxide as such but, as for the terms "$YO_2$" and "$X_2O_3$" such as $B_2O_3$ to the presence of said compounds as constituting elements of the framework structure of the zeolitic material, wherein "$M_2O$" refers to M as extra-framework element which is ionically bound to the negatively charged framework and which may accordingly be ion-exchanged against one or more further cationic elements and/or moieties.

In instances wherein one or more sources for $M_2O$ are provided in the mixture in step (a), no particular restriction applies neither with respect to the type or types of M, nor with respect to the amounts in which the one or more sources for $M_2O$ may be provided. Thus, by way of example, the molar ratio $M_2O:YO_2$ of the mixture provided in step (a) may range anywhere from 0.01:1 to 5:1, preferably from 0.02:1 to 2:1, more preferably from 0.04:1 to 1:1, more preferably from 0.06:1 to 0.6:1, more preferably from 0.08:1 to 0.4:1. More preferably, the molar ratio $M_2O:YO_2$ of the mixture provided in step (a) is in the range of from 0.1:1 to 0.25:1.

Furthermore, it is preferred according to the inventive process that the molar ratio $YO_2:B_2O_3:M_2O$ of the mixture provided in step (a) is in the range of (2-300):1:(0.01-200), preferably in the range of (5-200):1:(0.1-100), more preferably in the range of (10-150):1:(0.5-60), more preferably in the range of (20-100):1:(1-40), more preferably in the range of (40-90):1:(2-30), more preferably in the range of (50-80):1:4-20). More preferably, the molar ratio $YO_2:B_2O_3:M_2O$ of the mixture provided in step (a) is in the range of (60-70):1:(5-15).

According to the present inventive process, it is further preferred that the mixture provided in step (a) comprises one or more solvents. Again, there is no particular restriction neither with respect to the type or types, nor with respect to the amount or amount of said preferred one or more solvents, provided that a layered precursor of the boron-containing zeolitic material may be obtained in (b) and the boron-containing zeolitic material having an MWW framework structure may be obtained in (c). Said one or more solvents however preferably comprise water and/or one or more organic solvents, and more preferably comprise one or more solvents selected from the group consisting of water, monohydric alcohols, polyhydric alcohols, and combinations of two or more thereof, more preferably selected from the group consisting of water, methanol, ethanol, propanol, butanol, pentanol, ethane-1,2-diol, propane-1,2-diol, propane-1,2,3-triol, butane-1,2,3,4-tetraol, pentane-1,2,3,4,5-pentol, and combinations of two or more thereof, more preferably selected from the group consisting of water, methanol, ethanol, 2-propanol, and mixtures of two or more thereof, wherein more preferably the one or more solvents comprise water. More preferably, water is contained as the solvent in the mixture of step (a) of the present inventive process.

As noted above, in principle, any suitable amount of the one or more solvents may be employed in (a), wherein it is preferred according to the the present inventive process, that the molar ratio solvent:$YO_2$ of the one or more solvents to the one or more sources of $YO_2$ in the mixture provided in step (a) ranges from 1:1 to 250:1, preferably from 2:1 to 200:1, more preferably from 5:1 to 150:1, more preferably from 10:1 to 100:1, more preferably from 20:1 to 70:1, more preferably from 30:1 to 50:1. More preferably, the molar ratio solvent:$YO_2$ of the one or more solvents to the one or more sources of $YO_2$ in the mixture provided in step (a) is in the range of from 35:1 to 45:1.

As regards the mixing sequence of the components of the synthetic mixture in step (a), no specific restrictions exist. It is preferred that during the preparation of the synthetic mixture, the mixture is stirred at least part of the time. Depending on the scale of the process, it may be advantageous that after having added a given component of the synthetic mixture, the mixture is stirred for a certain period before the next component is added.

Step (b)

According to the present inventive process, the mixture obtained in step (a) is crystallized in step (b), for obtaining a layered precursor of a boron-containing MWW-type zeolitic material.

Concerning the crystallization procedure of step (b), said procedure is preferred to involve heating of the mixture of step (a), wherein any suitable temperature may be employed provided that a layered precursor of the boron-containing zeolitic material may be obtained in (b). Thus, by way of example, the crystallization in (b) may be conducted at a temperature in the range of from 80 to 250° C., wherein the temperature of heating preferably ranges from 100 to 230° C., more preferably from 115 to 210° C., more preferably from 130 to 200° C., more preferably from 140 to 190° C. More preferably, the crystallization process of step (b) involves heating of the mixture of step (a) at a temperature in the range from 150 to 180° C.

With respect to preferred embodiments of the present invention wherein the mixture in step (a) comprises one or more solvents and the crystallization in (b) is conducted under heating conditions, no particular restriction applies to the further conditions of crystallization, in particular with respect to the pressure under which crystallization is performed. It is, however, preferred according to the present invention that the crystallization process in step (b) is conducted under solvothermal conditions. More preferably, in instances wherein the one or more solvents comprise water, and in particular, when water is employed as the solvent in (a), the crystallization process in step (b) is conducted under hydrothermal conditions.

Concerning the crystallization procedure in step (b), it is preferred that said procedure is carried out under non-static conditions, more preferably under agitation, more preferably under rotating and/or stirring. More preferably, the crystallization in step (b) is carried out under stirring.

Concerning the duration of the crystallization procedure in step (b), no specific restrictions exist. It is however preferred that said procedure is carried out for a period in the range of from 4 h to 20 d, preferably from 12 h to 10 d, more preferably from 1 d to 8 d, more preferably from 2 d to 6 d, more preferably from 3 to 5 d. More preferably, the crystallization procedure in step (b) is carried out for a period in the range of from 3.5 to 4.5 d.

According to the present invention, it is preferred that after step (b) and prior to step (c) the inventive process further comprises
  (i) isolating the layered precursor obtained in step (b), preferably by filtration,
  (ii) optionally washing the layered precursor obtained in step (i),
  (iii) optionally drying the layered precursor obtained in step (i) or (ii).

In step (i) of the inventive process, the layered precursor obtained in step (b) may be isolated by any conceivable means, such as filtration, ultrafiltration, diafiltration, centrifugation, spray-drying and/or decantation methods, wherein the filtration methods may involve suction and/or pressure filtration steps. Preferably, the isolation of the layered precursor obtained step (b) is achieved by filtration and/or spray drying, more preferably by filtration.

In optional step (ii) of the inventive process, the washing of the layered precursor may be achieved by any conceivable means using any suitable washing agents. Washing agents which may be used are, for example, water, alcohols, and mixtures of two or more thereof. Jo More specifically, the washing agents may be selected from the group consisting of water, methanol, ethanol, propanol, or mixtures of two or more thereof. Examples of mixtures are mixtures of two or more alcohols, such as methanol and ethanol, or methanol and propanol, or ethanol and propanol, or methanol and ethanol and propanol, or mixtures of water and at least one alcohol, such as water and methanol, or water and ethanol, or water and propanol, or water and methanol and ethanol, or water and methanol and propanol, or water and methanol and ethanol and propanol. More preferably, the washing agents are water and/or at least one alcohol, more preferably water and/or ethanol. Even more preferably, the washing agent is water in optional step (ii).

In optional step (iii) of the inventive process, the drying of the layered precursor may be achieved by any conceivable temperature, provided that the solvent residues and/or moisture comprised in the layered precursor is removed. Accordingly, said drying procedure may principally be achieved by any one of for example desiccation, freeze-drying, heating, and/or applying vacuum to the layered precursor obtained in step (i) or (ii).

According to preferred embodiments, drying in step (iii) is achieved by heating of the layered precursor to a temperature in the range of from 50 to 250° C., preferably from 80 to 200° C., more preferably from 100 to 150° C., more preferably from 110 to 130° C. In general, the drying procedure of optional step (iii) is performed for a duration which allows for the substantial removal of any solvent and/or moisture from the layered precursor. Preferably, drying is performed for a duration in the range of from 1 to 48 h, more preferably from 2 to 24 h, more preferably from 5 to 16 h.

Step (c)

According to the present inventive process, the layered precursor obtained in step (b) is calcined for obtaining a boron-containing zeolitic material having an MWW framework structure.

Concerning the calcination procedure in step (c), no particular restriction applies, provided that a boron-containing zeolitic material having an MWW framework structure is obtained in (c). Thus, calcination may be performed under any suitable conditions, wherein said process is preferably carried out at a temperature in the range of from 300 to 900° C., preferably from 400 to 700° C., more preferably from 450 to 650° C. More preferably, the calcination procedure in step (c) is carried out at a temperature from 500 to 600° C.

According to preferred embodiments of the present invention, the inventive process may further comprise after step (c) the following step:
  (iv) deboronating the boron-containing zeolitic material having an MWW framework structure obtained in step (c) with a liquid solvent system, thereby obtaining a deboronated zeolitic material having an MWW framework structure.

The deboronation procedure of the present invention relates to a procedure wherein at least a portion of the boron atoms contained in the zeolitic framework structure is removed.

The liquid solvent system used in step (iv) is preferably selected from the group consisting of water, monohydric alcohols, polyhydric alcohols, and mixtures of two or more thereof. Concerning the monohydric alcohols and polyhydric alcohols, no specific restrictions exist. Preferably, these alcohols contain from 1 to 6 carbon atoms, more preferably from 1 to 5 carbon atoms, more preferably from 1 to 4 carbon atoms, and more preferably from 1 to 3 carbon atoms. The polyhydric alcohols preferably comprise from 2 to 5 hydroxyl groups, more preferably from 2 to 4 hydroxyl groups, preferably 2 or 3 hydroxyl groups. Especially preferred monohydric alcohols are methanol, ethanol, and propanol like 1-propanol and 2-propanol. Especially preferred polyhydric alcohols are ethane-1,2-diol, propane-1,2-diol, propane-1,3-diol, propane-1,2,3-triol. If mixtures of two or more of above-described compounds are employed, it is preferred that these mixtures comprise water and at least one monohydric and/or at least one polyhydric alcohol. Even more preferably, the liquid solvent system consists of water.

As regards the liquid solvent system used for the deboronation procedure of step (iv), in principle no particular restriction applies with respect to further components which may be contained in said liquid solvent system in addition to the particular and preferred solvents and combinations of solvent and in particular water which is particularly preferred as the solvent system. It is, however, preferred according to the present invention that the liquid solvent system does not contain an inorganic or organic acid or a salt thereof, the acid being selected from the group consisting of hydrochloric acid, sulfuric acid, nitric acid, phosphoric acid, formic acid, propionic acid, oxalic acid, and tartaric acid. According to the present invention it is further preferred that the solvent system used for the deboronation procedure does not contain an inorganic or organic acid or a salt thereof, wherein even more preferably the solvent system used for the deboronation procedure consists of water such that it does not contain any further components other than possible traces of impurities which may be present in distilled water.

As far as the amount of boron-containing zeolite relative to the amount of liquid solvent system for the deboronation procedure of step (iv), no specific restrictions exist. Preferably, the weight ratio of the boron-containing zeolitic material having an MWW framework structure relative to the liquid solvent system is in the range of from 1:5 to 1:40, more preferably from 1:10 to 1:30, more preferably from 1:10 to 1:20 such as from 1:10 to 1:15, from 1:11 to 1:16, from 1:12 to 1:17, from 1:13 to 1:18, from 1:14 to 1:19, from 1:15 to 1:20.

Concerning the deboronation procedure in step (iv), said process is preferably carried out at a temperature in the range of from 50 to 125° C., more preferably from 70 to 120° C., more preferably from 90 to 115° C., more preferably from 90 to 110° C., more preferably from 95 to 105° C. More preferably, the deboronation according to step (iv) is carried out at the boiling point of the solvent system. If the solvent system comprises 2 or more components, the deboronation according to step (iv) is preferably carried out at the boiling point of the component having the lowest boiling point. According to a further preferred embodiment of the present invention, the deboronation according to step (iv) is carried out under reflux. Thus, the preferred vessel used for the deboronation according to step (iv) is equipped with a reflux condenser. During the deboronation procedure of step (iv), the temperature of the liquid solvent system is kept essentially constant or changed. More preferably, the temperature is kept essentially constant.

Concerning the duration of the deboronation procedure in step (iv), no specific restrictions exist. Preferably, said deboronation procedure is carried out for a time period in the range of from 6 to 20 h, preferably from 7 to 17 h, more preferably from 8 to 14 h. More preferably, the deboronation procedure in step (iv) is carried out at a time period in the range of from 9 to 12 h. The time period is to be understood as the time where the liquid solvent system is maintained under the above-described deboronation temperature.

Boron-Containing MWW Zeolites

The present invention also relates to the a synthetic boron-containing zeolitic material having an MWW framework structure obtainable and/or obtained according to any of the particular and preferred embodiments of the inventive process as described in the foregoing. Thus, besides relating to the direct products of the inventive process, the present invention further relates to a boron-containing zeolitic material having an MWW framework structure comprising $YO_2$ and $B_2O_3$ which is obtainable according to the inventive process, independently of the actual process according to which is has been obtained.

Concerning the synthetic boron-containing zeolitic materials of the present invention, no particular restrictions apply relative to their chemical and physical properties provided that they may be obtained according to any of the particular or preferred embodiments of the present invention as defined in the present application. This also applies with respect to the structure of the inventive materials, such that no particular restrictions apply in this respect, provided that the material displays the MWW framework structure.

Concerning the composition of the present inventive zeolite, it is preferred that said zeolite comprises $YO_2$ and $X_2O_3$, wherein Y is a tetravalent element and X is a trivalent element. More preferably, the inventive zeolite comprises said $YO_2$ and $X_2O_3$ in its MWW framework structure.

With respect to the Y element in the inventive zeolite, said element is preferably selected from the group consisting of Si, Sn, Ti, Zr, Ge and combinations of two or more thereof. More preferably, Y is Si for the inventive zeolite.

With respect to the X element in the inventive zeolite, said element is preferably selected from the group consisting of Al, B, In, Ga, and combinations of two or more thereof. More preferably, X is B and/or Al, more preferably B for the inventive zeolite.

Concerning the $YO_2$:$X_2O_3$ molar ratio of the inventive zeolite, no specific restrictions exist. Said $YO_2$:$X_2O_3$ molar ratio is, however, preferably in the range of 2 to 300, more preferably from 5 to 200, more preferably from 10 to 150, more preferably from 20 to 100, more preferably from 40 to 90, more preferably from 50 to 80. More preferably, the $YO_2$:$X_2O_3$ molar ratio of the inventive zeolite is in the range of from 60 to 70.

According to the present inventive zeolite, it is preferred that said zeolite comprises one or more alkali metals M as extra-framework ion. The one or more alkali metals M are preferably selected from the group consisting of Li, Na, K, Rb, Cs, and combinations of two or more thereof, more preferably Na and/or Li. More preferably, Na is the alkali metal in the present inventive zeolite.

According to the present invention it is preferred that the lattice parameter for the c-axis of the zeolitic structure, as obtained from X-ray structure analysis, is in the range of from 25.0 to 27.8 Angstrom, and more preferably in the range of from 26.0 to 27.5 Angstrom, more preferably from 26.5 to 27.2 Angstrom, more preferably from 26.8 to 27.1 Angstrom, and more preferably from 26.9 to 27.05 Angstrom. According to the present invention it is particularly preferred that the lattice parameter of the c-axis of the inventive zeolite is in the range of from 26.99 to 27.03 Angstrom.

Concerning the surface area of the present inventive zeolite, there are no specific restrictions. However, said zeolite preferably has a BET surface area, determined according to DIN-ISO 9277:2010, in the range of from 50 to 1000 m$^2$/g, more preferably from 100 to 800 m$^2$/g, more preferably from 150 to 600 m$^2$/g, more preferably from 200 to 500 m$^2$/g, more preferably from 250 to 450 m$^2$/g, and more preferably from 300 to 400 m$^2$/g. More preferably, the present inventive zeolite is characterized by a BET surface area in the range of from 340 to 370 m$^2$/g, as determined according to DIN-ISO 9277:2010.

Applications

The present invention further relates to the use of the aforementioned boron-containing zeolitic material having an MWW framework structure.

In principle, the inventive materials may be used in any suitable application. Thus, by way of example the synthetic boron-containing zeolitic material according to any of the particular and preferred embodiments of the present invention may be used as a precursor for further structural modification, as a catalyst, as a catalyst support, as an adsorbent, as an absorbent, as a filler, and/or as a molecular sieve. Preferably, the inventive zeolitic material is used as a molecular sieve, as an adsorbent, more preferably for ion-exchange and/or for separation of gas or liquid mixtures, as a catalyst and/or as a catalyst component, more preferably for hydrocarbon conversion, dehydration, epoxidation, epoxide ring opening, etherification, esterification, ammoxidation, or diesel oxidation catalysis, and more preferably for isomerization, alkylation, or epoxidation. According to the present invention it is particularly preferred that the zeolitic material having an MWW framework structure is used as a catalyst for epoxidation or alkylation, and more preferably for epoxidation.

The present invention is further characterized by the following preferred embodiments, including the combinations of embodiments indicated by the respective dependencies:

1. A process for the production of a boron-containing zeolitic material having an MWW framework structure comprising $YO_2$ and $B_2O_3$, wherein Y stands for a tetravalent element, wherein said process comprises (a) providing a mixture comprising one or more sources for $YO_2$, one or more sources for $B_2O_3$, one or more organotemplates, and seed crystals,
(b) crystallizing the mixture obtained in (a) for obtaining a layered precursor of the boron-containing MWW-type zeolitic material,
(c) calcining the layered precursor obtained in (b) for obtaining the boron-containing zeolitic material having an MWW framework structure,
wherein the one or more organotemplates have the formula (I)

$R^1R^2R^3N$          (I)

wherein $R^1$ is $(C_5-C_8)$cycloalkyl, and
wherein $R^2$ and $R^3$ are independently from each other H or alkyl.

2. The process of embodiment 1, wherein $R^1$ is selected from the group consisting of substituted and/or unsubstituted cyclopentyl, cyclohexyl, cycloheptyl, and cyclooctyl, more preferably from the group consisting of substituted and/or unsubstituted cyclopentyl, cyclohexyl and cycloheptyl, wherein more preferably $R^1$ is substituted or unsubstituted cyclohexyl or cycloheptyl, more preferably substituted or unsubstituted cyclohexyl, more preferably unsubstituted cyclohexyl.

3. The process of embodiment 1 or 2, wherein $R^2$ and $R^3$ are independently from each other H or $(C_1-C_3)$ alkyl, wherein more preferably $R^2$ and $R^3$ are independently from each other selected from the group consisting of H, methyl, ethyl and propyl, wherein more preferably $R^2$ and $R^3$ are H.

4. The process of any one of embodiments 1 to 3, wherein the seed crystals comprise $YO_2$ and $X_2O_3$, wherein X is a trivalent element, wherein X is preferably selected from the group consisting of Al, B, In, Ga, and combinations of two or more thereof, X more preferably being Al and/or B, more preferably being B.

5. The process of any one of embodiments 1 to 4, wherein Y is selected from the group consisting of Si, Sn, Ti, Zr, Ge and combinations of two or more thereof, Y preferably being Si and/or Ti, wherein more preferably Y is Si.

6. The process of any one of embodiments 1 to 5, wherein Y is Si, and wherein the one or more sources for $YO_2$ according to (a) are selected from the group consisting of silicas, silicates, silicic acid and combinations of two or more thereof, preferably selected from the group consisting of silicas, alkali metal silicates, silicic acid, and combinations of two or more thereof, more preferably selected from the group consisting of fumed silica, silica hydrosol, colloidal silica, reactive amorphous solid silica, silica gel, pyrogenic silica, lithium silicates, sodium silicates, potassium silicates, silicic acid, and combinations of two or more thereof, more preferably selected from the group consisting of fumed silica, silica hydrosol, colloidal silica, silica gel, pyrogenic silica, sodium silicates, silicic acid, and combinations of two or more thereof, more preferably selected from the group consisting of fumed silica, silica hydrosol, colloidal silica, silica gel, pyrogenic silica, and combinations of two or more thereof, wherein more preferably the one or more sources for $YO_2$ are silica hydrosol and/or colloidal silica, more preferably colloidal silica.

7. The process of any one of embodiments 1 to 6, wherein the one or more sources for $B_2O_3$ according to (a) are selected from the group consisting of boric acid, boron oxide, borates, borate esters, and combinations of two or more thereof, preferably selected from the group consisting of boric acid, boron oxide, orthoborates, diborates, triborates, tetraborates, trimethyl borate, triethyl borate, and combinations of two or more thereof, wherein more preferably the one or more sources for $B_2O_3$ are boron oxide and/or boric acid, more preferably boric acid.

8. The process of any one of embodiments 1 to 7, wherein the molar ratio $YO_2:B_2O_3$ of the one or more sources of $YO_2$ to the one or more sources for $B_2O_3$ in the mixture provided according to (a) is in the range of from 1:1 to 300:1, preferably from 1.2:1 to 100:1, more preferably from 1.4:1 to 50:1, more preferably from 1.6:1 to 20:1, more preferably from 1.8:1 to 10:1, more preferably from 2.0:1 to 8:1, more preferably from 2.1:1 to 7:1.

9. The process of any one of embodiments 1 to 8, wherein the one or more organotemplates are selected from the group consisting of substituted and/or unsubstituted $(C_5-C_8)$cycloalkylamines, preferably selected from the group consisting of substituted and/or unsubstituted cyclopentylamine, cyclohexylamine, cycloheptylamine, cyclooctylamine, and combinations of two or more thereof, wherein more preferably the one or more organotemplates are substituted and/or unsubstituted cyclohexylamine and/or cycloheptylamine, more preferably unsubstituted cyclohexylamine.

10. The process of any one of embodiments 1 to 9, wherein apart from organotemplate optionally contained in the seed crystals, the mixture provided according to (a) does not contain piperidine or hexamethyleneimine, preferably does not contain piperidine and hexamethyleneimine, more preferably does not contain $(C_4-C_7)$alkyleneimines and $(C_5-C_8)$alkylamines other than the one or more organotemplates according to formula (I), and more preferably does not contain alkyleneimines and alkylamines other than the one or more organotemplates according to formula (I).

11. The process of any one of embodiments 1 to 10, wherein the molar ratio organotemplate:$YO_2$ of the one or more organotemplates to the one or more sources for $YO_2$ in the mixture provided according to (a) is in the range of from 0.02:1 to 10:1, preferably from 0.05:1 to 4:1, more preferably from 0.1:1 to 2:1, more preferably from 0.15:1 to 1:1, more preferably from 0.2:1 to 0.8:1, more preferably from 0.23:1 to 0.7:1, more preferably from 0.25:1 to 0.6:1, wherein the one or more organotemplates do not include organotemplate optionally contained in the seed crystals.

12. The process of any one of embodiments 1 to 11, wherein the molar ratio $YO_2:B_2O_3$:organotemplate of the one or more sources of $YO_2$ to the one or more sources of $B_2O_3$ to the one or more organotemplates in the mixture provided according to (a) is in the range of 0.003-2):(0.02-10), preferably in the range of 1:(0.01-1.6):(0.05-4), more preferably in the range of 1:(0.02-1.3):(0.1-2), more preferably in the range of 1:(0.05-1):(0.15-1), more preferably in the range of 1:(0.1-0.8):(0.2-0.8), more preferably in the range of 1:(0.13-0.6):(0.23-0.7), more preferably in the range of 1:(0.14-0.48):(0.25-0.6), wherein the one or more organotemplates do not include organotemplate optionally contained in the seed crystals.

13. The process of any one of embodiments 1 to 12, wherein the mixture provided according to (a) comprises one or more sources for $M_2O$, wherein M stands for one or more alkali metals M, wherein the one or more alkali metals M are preferably selected from the group consisting of Li, Na, K, Rb, Cs, and combinations of two or more thereof, more preferably from the group consisting of Li, Na, Rb and combinations of two or more thereof, wherein more preferably the one or more alkali metals M are Li and/or Na, more preferably Na.

14. The process of embodiment 13, wherein the molar ratio $M_2O:YO_2$ of the mixture provided according to (a) is in the range of from 0.01:1 to 5:1, preferably from 0.02:1 to 2:1, more preferably from 0.04:1 to 1:1, more preferably from 0.06:1 to 0.6:1, more preferably from 0.08:1 to 0.4:1, more preferably from 0.1:1 to 0.25:1.

15. The process of embodiment 13 or 14, wherein the molar ratio $YO_2:B_2O_3:M_2O$ of the mixture provided in (a) is in the range of (2-300):1:(0.01-200), preferably in the range of (5-200):1:(0.1-100), more preferably in the range of (10-150):1:(0.5-60), more preferably in the range of (20-100):1:(1-40), more preferably in the range of (40-90):1:(2-30), more preferably in the range of (50-80):1:(4-20), more preferably in the range of (60-70):1:(5-15).

16. The process of any one of embodiments 1 to 15, wherein the amount of seed crystals in the mixture provided in (a) is in the range of from 0.05 to 80 weight-% based on 100 weight-% of $YO_2$ in the one or more sources for $YO_2$, preferably from 0.1 to 60 weight-%, more preferably from 0.2 to 40 weight-%, more preferably from 0.5 to 25 weight-%, more preferably from 1 to 20 weight-%, more preferably from 2 to 15 weight-%, more preferably from 4 to 12 weight-%, more preferably from 5 to 10 weight-%.

17. The process of any one of embodiments 1 to 16, wherein the mixture provided in (a) further comprises one or more solvents, wherein the one or more solvents preferably comprise water and/or one or more organic solvents, more preferably comprises one or more solvents selected from the group consisting of water, monohydric alcohols, polyhydric alcohols, and combinations of two or more thereof, more preferably selected from the group consisting of water, methanol, ethanol, propanol, butanol, pentanol, ethane-1,2-diol, propane-1,2-diol, propane-1,2,3-triol, butane-1,2,3,4-tetraol, pentane-1,2,3,4,5-pentol, and combinations of two or more thereof, more preferably selected from the group consisting of water, methanol, ethanol, 2-propanol, and mixtures of two or more thereof, wherein more preferably the one or more solvents comprise water, wherein more preferably water is contained as the one or more solvents further provided in (a).

18. The process of embodiment 17, wherein the molar ratio solvent:$YO_2$ of the one or more solvents to the one or more sources of $YO_2$ in the mixture provided in (a) is in the range of from 1:1 to 250:1, preferably from 2:1 to 200:1, more preferably from 5:1 to 150:1, more preferably from 10:1 to 100:1, more preferably from 20:1 to 70:1, more preferably from 30:1 to 50:1, and more preferably from 35:1 to 45:1.

19. The process of any one of embodiments 1 to 18, wherein the crystallization in (b) involves heating of the mixture, preferably at a temperature in the range of from 80 to 250° C., preferably from 100 to 230° C., more preferably from 115 to 210° C., more preferably from 130 to 200° C., more preferably from 140 to 190° C., more preferably from 150 to 180° C.

20. The process of any one of embodiments 1 to 19, wherein the crystallization in (b) is conducted under solvothermal conditions, preferably under hydrothermal conditions.

21. The process of any one of embodiments 1 to 20, wherein the crystallization in (b) is carried out under non-static conditions, preferably under agitation, more preferably under rotating and/or stirring, wherein more preferably the crystallization in (b) is carried out under stirring.

22. The process of any one of embodiments 1 to 21, wherein the crystallization in (b) is carried out for a period in the range of from 4 h to 20 d, preferably from 12 h to 10 d, more preferably from 1 d to 8 d, more preferably from 2 d to 6 d, more preferably from 3 to 5 d, more preferably from 3.5 to 4.5 d.

23. The process of any one of embodiments 1 to 22, wherein after step (b) and prior to step (c) the process further comprises
   (i) isolating the layered precursor obtained in (b), preferably by filtration,
   (ii) optionally washing the layered precursor obtained in (i),
   (iii) optionally drying the layered precursor obtained in (i) or (ii).

24. The process of any one of embodiments 1 to 23, wherein the calcination in (c) is carried out at a temperature in the range of from 300 to 900° C., preferably from 400 to 700° C., more preferably from 450 to 650° C., more preferably from 500 to 600° C.

25. The process of any one of embodiments 1 to 24, wherein after step (c) the process further comprises
   (iv) deboronating the boron-containing zeolitic material having an MWW framework structure obtained in (c) with a liquid solvent system, thereby obtaining a deboronated zeolitic material having an MWW framework structure.

26. The process of embodiment 25, wherein the liquid solvent system in (iv) is selected from the group consisting of water, monohydric alcohols, polyhydric alcohols, and mixtures of two or more thereof, and wherein said liquid solvent system does not contain an inorganic or organic acid or a salt thereof, the acid being selected from the group consisting of hydrochloric acid, sulfuric acid, nitric acid, phosphoric acid, formic acid, propionic acid, oxalic acid, and tartaric acid.

27. The process of embodiment 25 or 26, wherein the deboronation in (iv) is carried out at a temperature in the range of from 50 to 125° C., preferably from 70 to 120° C., more preferably from 90 to 115° C., more preferably from 90 to 110° C.

28. The process of any one of embodiments 25 to 27, wherein the deboronation in (iv) is carried out for a time period in the range of from 6 to 20 h, preferably from 7 to 17 h, more preferably from 8 to 14 h, more preferably from 9 to 12 h.

29. The process of any one of embodiments 1 to 28, wherein the seed crystals comprise a zeolitic material having an MWW framework structure and/or a layered precursor of a zeolitic material having an MWW framework structure, and wherein preferably the seed crystals comprise a layered precursor of a zeolitic material having an MWW framework structure.

30. The process of embodiment 29, wherein the layered precursor of a zeolitic material having an MWW framework structure is obtainable according to step (b) of the process of any one of embodiments 1 to 23 and/or the zeolitic material having an MWW framework structure is obtainable according to the process of any one of embodiments 1 to 28.

31. A synthetic boron-containing zeolitic material having an MWW framework structure obtainable and/or obtained according to the process of any one of embodiments 1 to 30.

32. The synthetic zeolitic material of embodiment 31, wherein the lattice parameter for the c-axis of the crystal structure as obtained from X-ray structure analysis is in the range of from 25.0 to 27.8 Angstrom, preferably from 26.0 to 27.5 Angstrom, more preferably from 26.5 to 27.2 Angstrom, more preferably from 26.8 to 27.1 Angstrom, more preferably from 26.9 to 27.05 Angstrom, and more preferably from 26.99 to 27.03 Angstrom.

33. Use of a synthetic zeolitic material having an MWW framework structure according to embodiment 31 or 32 as a molecular sieve, as an adsorbent, preferably for ion-exchange and/or for separation of gas or liquid mixtures, as a catalyst and/or as a catalyst component, preferably for hydrocarbon conversion, dehydration, epoxidation, epoxide ring opening, etherification, esterification, ammoxidation, or diesel oxidation catalysis, more preferably for isomerization, alkylation, or epoxidation, and wherein more preferably the zeolitic material having an MWW framework structure is used as a catalyst for epoxidation or alkylation.

DESCRIPTION OF THE FIGURES

FIG. 12(b) (middle) is the XRD pattern of the product obtained with the organotemplate CHA but without seed crystals; FIG. 12(c) (bottom) is the XRD pattern of the product obtained with seed crystals but without the organotemplate CHA. In the figure, the diffraction angle 2 theta in ° is shown along the abscissa and the intensities are plotted along the ordinate.

EXAMPLES

Figure 1:
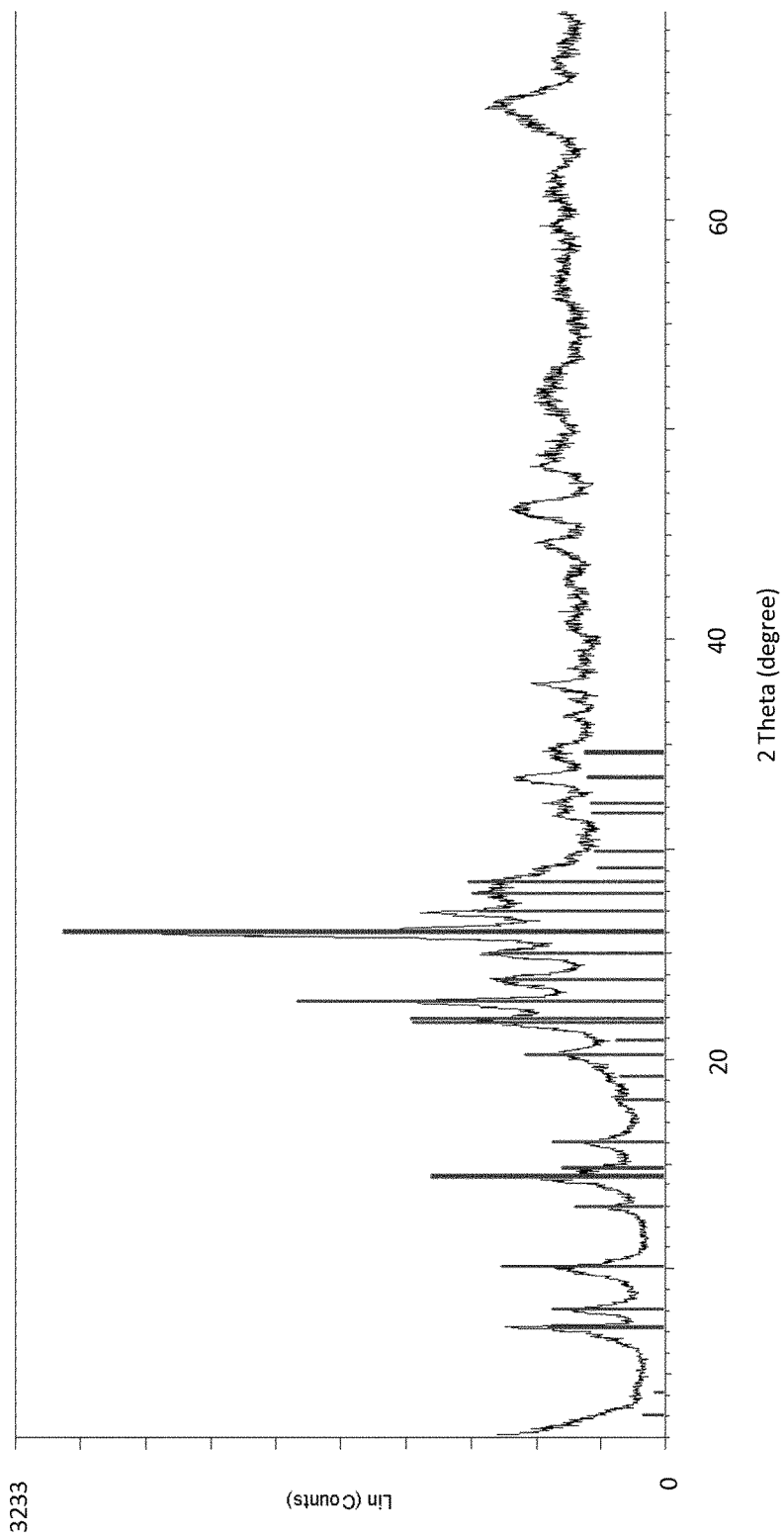
FIG. 1 shows the XRD (X-Ray Diffraction) pattern of the calcined Al-MWW seed crystals obtained in reference Example 1, wherein the line pattern of MCM-22 has been included as a reference. In the figure, the diffraction angle 2 theta in ° is shown along the abscissa and the intensities are plotted along the ordinate.

The particle size and the crystallinity of the zeolitic materials according to the present invention were determined by XRD analysis. The data were collected using a standard Bragg-Brentano diffractometer with a Cu-X-ray source and an energy dispersive point detector. The angular range of 2° to 70° (2 theta) was scanned with a step size of 0.02°, while the variable divergence slit was set to a constant illuminated sample length of 20 mm. The data were then analyzed using TOPAS V4 software, wherein the sharp diffraction peaks were modeled using a Pawley fit containing a unit cell with the following starting parameters: a=14.4 Angstrom and c=25.2 Angstrom in the space group P6/mmm. These were refined to fit the data. Independent peaks were inserted at the following positions. 8.4°, 22.4°, 28.2° and 43°. These were used to describe the amorphous content. The crystalline content describes the intensity of the crystalline signal to the total scattered intensity. Included in the model were also a linear background, Lorentz and polarization corrections, lattice parameters, space group and crystallite size.

Solid-state NMR experiments were conducted by packing samples in $ZrO_2$ rotors under ambient air. Measurements were performed using a 14.1 Tesla Bruker Avance III spectrometer equipped with a 4 mm Bruker MAS probe, at 6 kHz Magic Angle Spinning, at approximately 298 K sample temperature. $^{11}$B direct polarization spectra were obtained using ($\pi/2$)-pulse excitation with 6 µs pulse width, with $^{11}$B carrier frequency corresponding to −4 ppm in the spectrum. Signal was acquired for 34 ms, recycling ca. 1500 scans with a delay of 2 s. Spectra were processed using Bruker Topspin with 20 Hz exponential line broadening, manual phasing, and manual baseline correction over the full spectrum width. The $^{11}$B resonance frequency was referenced to $BF_3.Et_2O$ as an external zero standard.

Reference Example 1: Preparation of the Layered Precursor of Al-MWW and of Al-MWW Used as Seed Crystals 10.40 g of $NaAlO_2$ (43 weight-% $Na_2O$, 53 weight-% $Al_2O_3$) and 6.0 g of NaOH were dissolved in 1239.4 g of deionied water in a 2.5 L glass beaker. To this solution, 259 g of Ludox AS40 (40 weight-% $SiO_2$) and 85.60 g of hexamethyleneimine were then added. The obtained gel has a molar composition of 40.28 $SiO_2$:1.26 $Al_2O_3$:3.43 $Na_2O$: 1606$H_2O$: 20.13 hexamethyleneimine. Said gel was transfered into a 2.5 L autoclave, and heated up to 150° C. in 1 h under a rotating speed of 100 rpm. The crystallization was then carried out at 150° C. for 168 h.

After the crystallization process, the white suspension obtained was adjusted with an $HNO_3$ solution to reach a pH of about 6.0. Said suspension was then filtered, and washed with deionized water. The solid product, i.e., an Al-MWW precursor, was dried at 120° C. for 16 h.

Calcination of the Al-MWW precursor affords the Al-MWW zeolite. The calcination may be carried out by heating up the Al-MWW precursor to 500° C. with a ramping rate of 1° C./min, and then maintaining it at 500° C. for 10 h. When doing so, 112 g of solid product was obtained.

FIG. 1 shows the XRD pattern of the calcined product, from which it is apparent that said product has a MWW framework structure. The lattice constants a and c of the MWW product are determined to be 14.224 and 26.221 Å, respectively. The crystallinity of the MWW product is 82%, as measured from the XRD results. The average crystal size is measured to be 16.5 nm.

Furthermore, as measured by the elemental analysis, the calcined MWW product contains 38 weight-% of Si, 2.5 weight-% of Al, 0.22 weight-% of Na, and less than 0.5 weight-% of carbon. Thus, the calcined MWW product displays an $SiO_2$:$Al_2O_3$ molar ratio of 29.2.

Example 1: Preparation of B-MWW Using the Layered Precursor of Al-MWW as Seed Crystals 0.15 g of NaOH and 0.6 g of $H_3BO_3$ were dissolved in 8 g of deionized water. To this solution, 0.7 g of cyclohexylamine (CHA) was added and stirred for 30 min. Subsequently, 2.7 g of colloidal silica sol (GS30 silicate containing 30.5 weight-% $SiO_2$, from Yuda Chemical Industry, China) was added dropwise to the solution, and followed by a stirring of 4 h at ambient temperature. The obtained gel has a molar composition of 0.131 $Na_2O$:1 $SiO_2$: 0.354 $B_2O_3$:41 $H_2O$:0.514 CHA. 0.04 g of (uncalcined) Al-MWW layered precursor obtained according to Reference Example 1 (5 weight-% relative to $SiO_2$ in the reaction mixture) was then added as seed crystals and stirred for 10 min. The mixture was transferred into a Teflon-lined autoclave and crystallized at 150° C. for 4 d under a rotation speed of 50 rpm. The crystallized product was filtrated, washed with deionized water, and dried at 100° C. for 4 h for affording the layered precursor of B-MWW. The dried product was then calcined at 500° C. for 6 h, thus affording the B-MWW zeolite.

Figure 2:
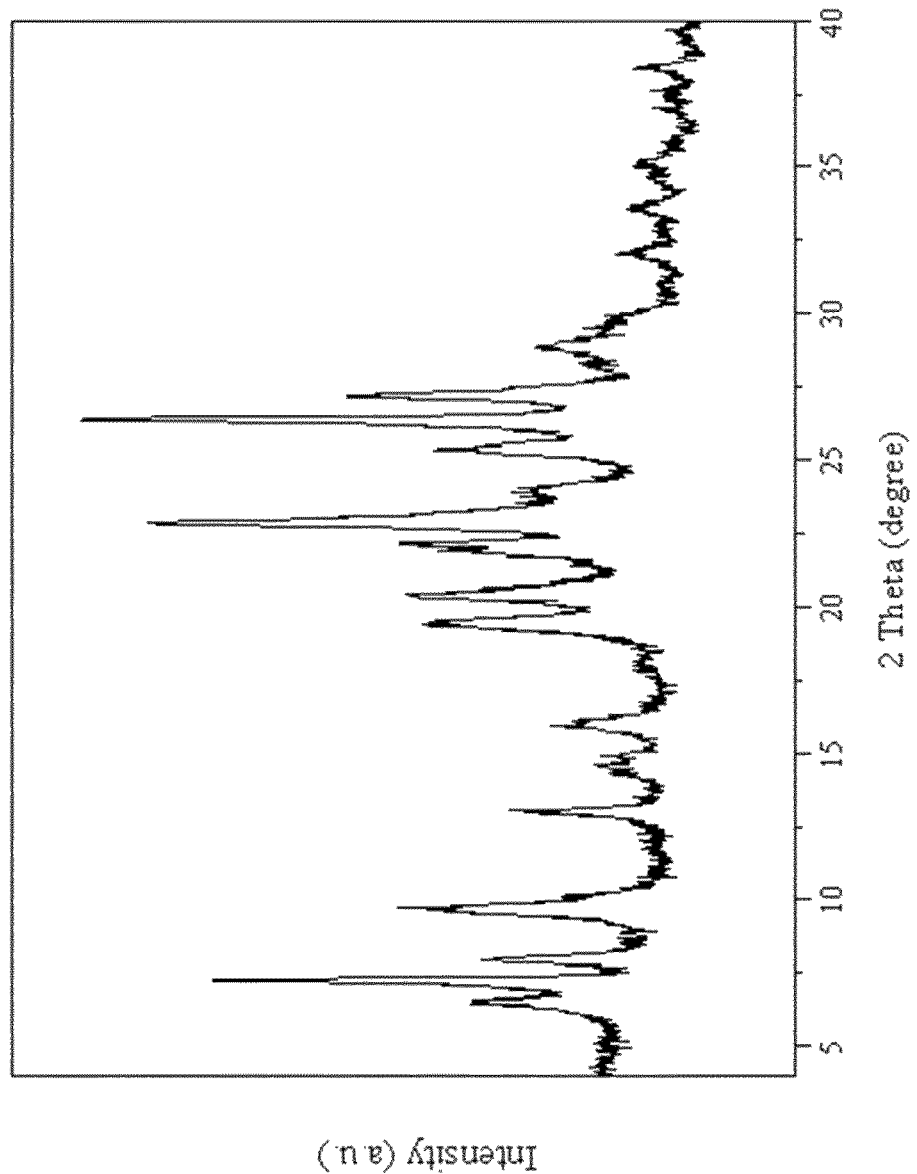
FIG. 2 shows the XRD pattern of the B-MWW zeolitic product obtained in Example 1. In the figure, the diffraction angle 2 theta in ° is shown along the abscissa and the intensities are plotted along the ordinate.

FIG. 2 shows the XRD pattern of the calcined product, from which it is apparent that said product has a MWW framework structure.

The Si:B molar ratio of the obtained product is 32.8, as measured by the ICP. The yield of the product with respect to $SiO_2$ is 98%.

Figure 3:
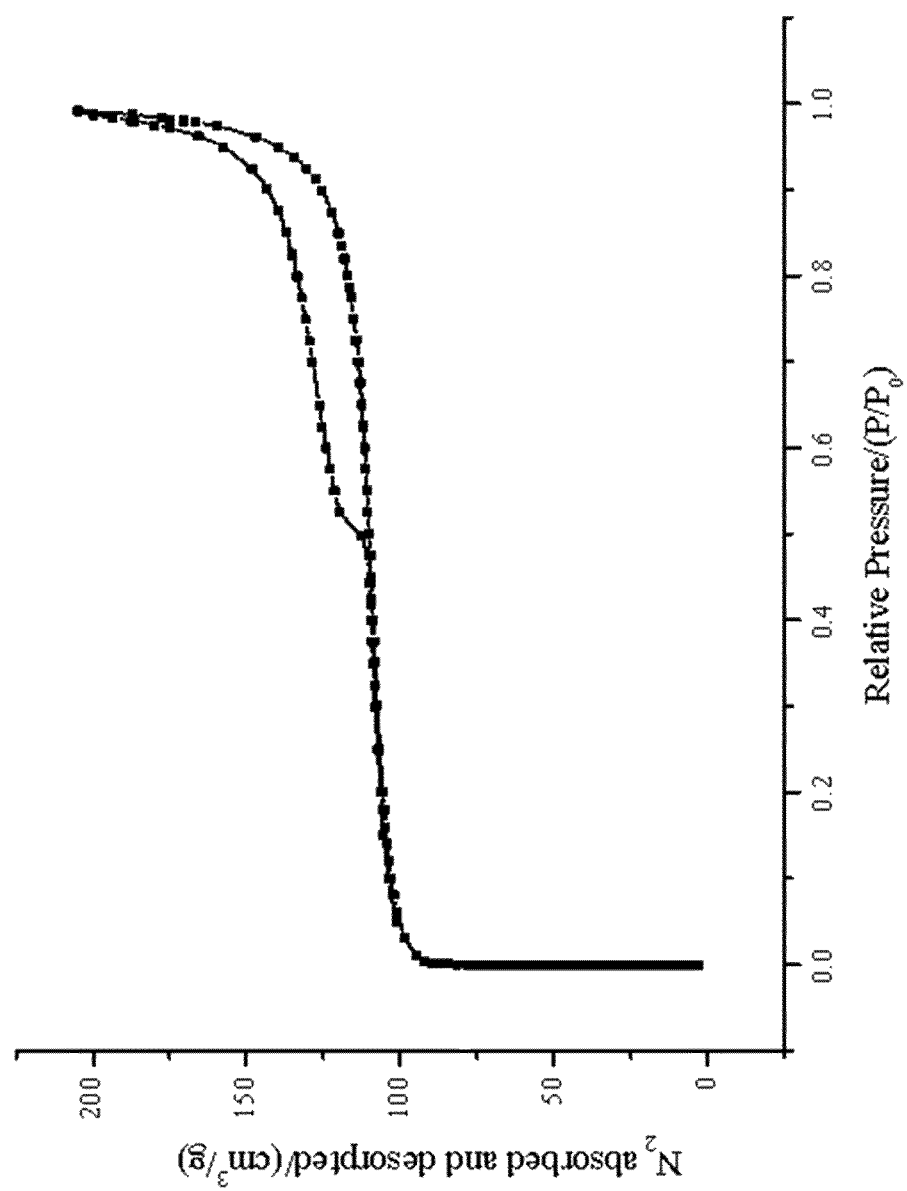
FIG. 3 shows the nitrogen sorption isotherm of the calcined MWW zeolitic product obtained in Example 1. In the figure, the relative pressure p/p° is plotted along the abscissa and the pore volume in cm³/g is plotted along the ordinate.

FIG. 3 shows the $N_2$ sorption isotherm of the calcined MWW product. The BET specific surface area of said product according to DIN-ISO 9277:2010 is 356 $m^2$/g. Furthermore, the product displays a micropore volume of 0.15 $m^3$/g.

Figure 4:
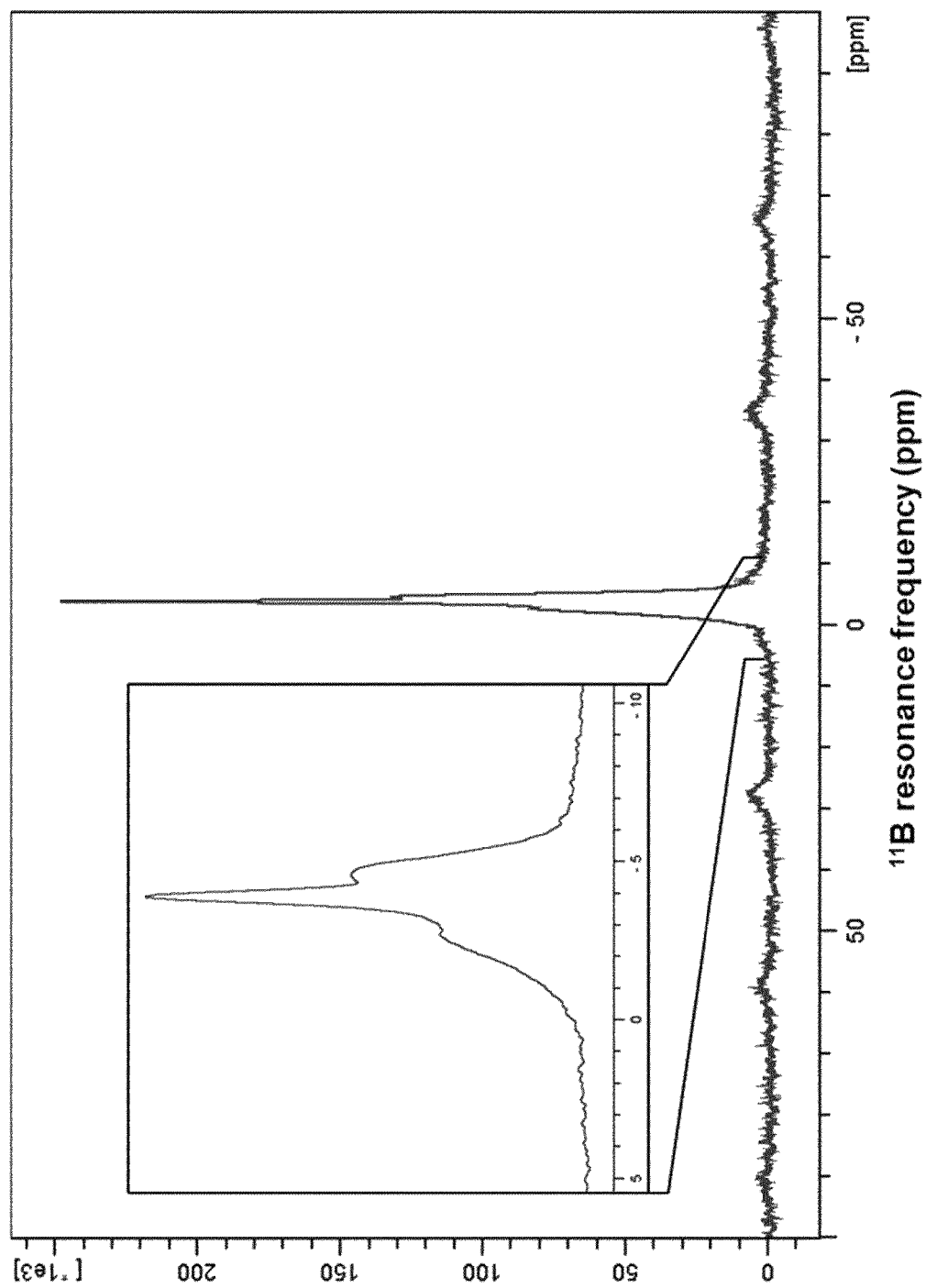
FIG. 4 shows the $^{11}$B MAS NMR of the calcined MWW product obtained according to Example 1. In the figure, the chemical shift in ppm is plotted along the abscissa and the relative intensity is plotted along the ordinate. Furthermore, a blow-up of the NMR for the range of ppm values between 5 and 10 ppm is shown, wherein again the chemical shift in ppm is plotted along the abscissa and the relative intensity in arbitrary units is plotted along the ordinate

FIG. 4 shows the $^{11}B$ MAS NMR of the calcined MWW product. The peak centered around −4 ppm that may be assigned to tetrahedral boron coordination (B[4]). In particular, no signals from trigonal coordination sites (B[3]) are observed in the spectrum, such that according to the NMR spectrum, boron contained in the sample is exclusively present in the framework structure, where it is tetrahedrally coordinated.

Example 2: Preparation of B-MWW Using the Layered Precursor of Al-MWW as Seed Crystals 22.5 g of NaOH and 90 g of $H_3BO_3$ were dissolved in 1335.7 g of deionized water. To this solution, 105 g of cyclohexylamine was added and stirred for 30 min. The pH of the obtained solution is 10.8. Subsequently, 309.2 g of Ludox AS40 (40 weight-% $SiO_2$) was added to the solution, which was then stirred for 4 h. The obtained gel has a molar composition of 0.131 $Na_2O$:1 $SiO_2$:0.354$B_2O_3$:41 $H_2O$: 0.514 CHA. 6 g of (uncalcined) Al-MWW precursor obtained according to Reference Example 1 (5 weight-% relative to $SiO_2$ in the reaction mixture) were added as seed crystals into said gel, followed by a stirring of 10 min. The mixture was transferred into an autoclave and heated up to 150° C. in 1 h. The crystallization was carried out with a rotation speed of 150 rpm at 150° C. for 4 d. The solid product was filtrated, washed with deionized water, and dried at 120° C. for 10 h for affording the layered precursor of B-MWW. Finally, after a calcination at 650° C. for 5 h, 117 g of B-MWW zeolitic product was obtained.

Figure 5:
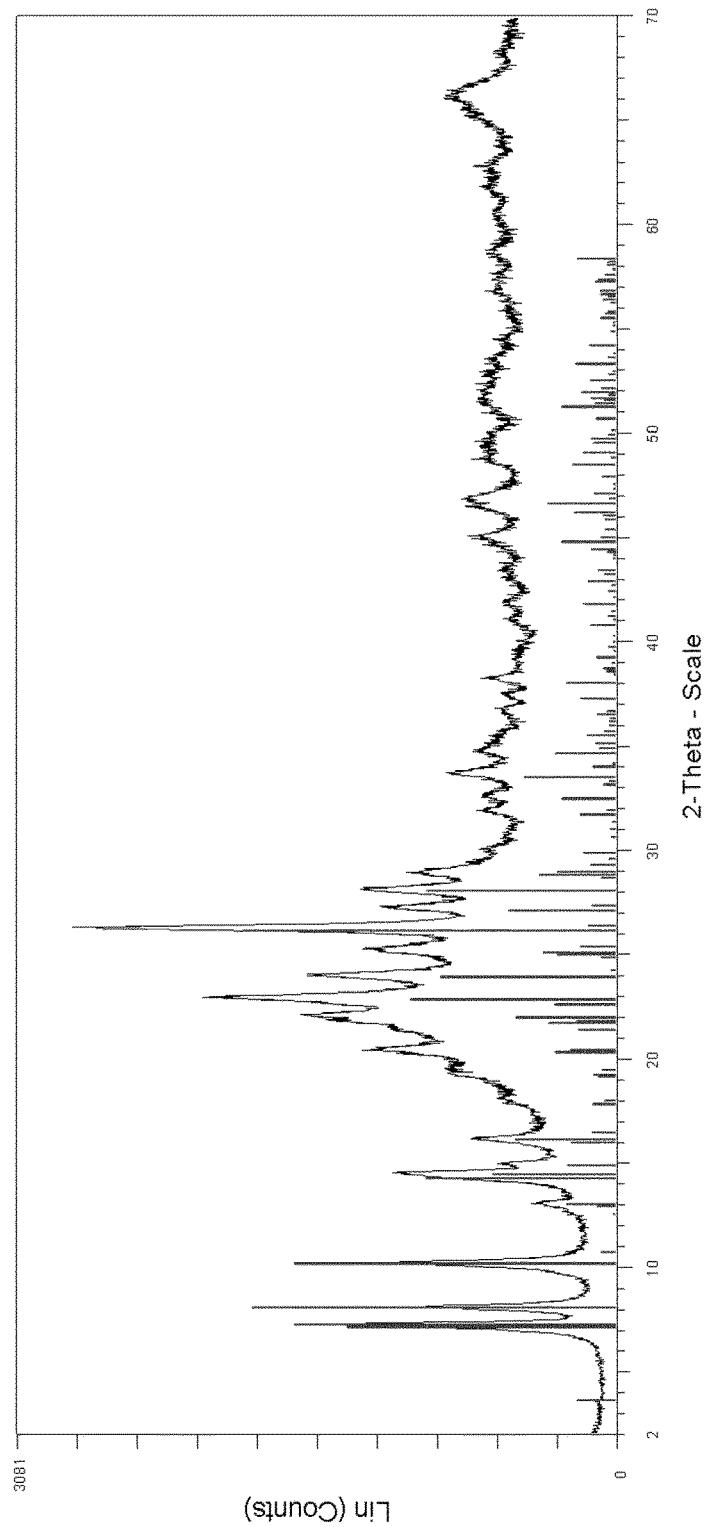
FIG. 5 shows the XRD pattern of the MWW zeolitic product obtained in Example 2, wherein the line pattern of the MWW framework structure has been included as a reference. In the figure, the diffraction angle 2 theta in ° is shown along the abscissa and the intensities are plotted along the ordinate.

FIG. 5 shows the XRD pattern of the zeolitic product, from which it is apparent that the product has an MWW framework structure. The crystallinity of the MWW zeolite product is 76%. The average crystal size of the product is measured to be 22.5 nm. The lattice constants a and c of the MWW zeolite product are 14.087 and 26.109 Å, respectively.

Furthermore, the BET surface area of the MWW zeolite product is determined to be 209 $m^2$/g. The MWW zeolite product contains 44 weight-% of Si, 0.78 weight-% of B, 0.12 weight-% of Al, and less than 0.1 weight-% of C, as measured by the elemental analysis.

Example 3: Examining the Influence of the $B_2O_3$ Content

Example 1 was repeated but with different $SiO_2$:$B_2O_3$ molar ratios used for the gel precursor. $SiO_2$:$B_2O_3$ molar ratios of 6.7, 4.4, 3.35, 2.8, 2.2 and 1.9 were employed for the synthesis in order to investigate the effect of different $SiO_2$:$B_2O_3$ molar ratios on the crystallinity of the zeolitic products.

Figure 6:
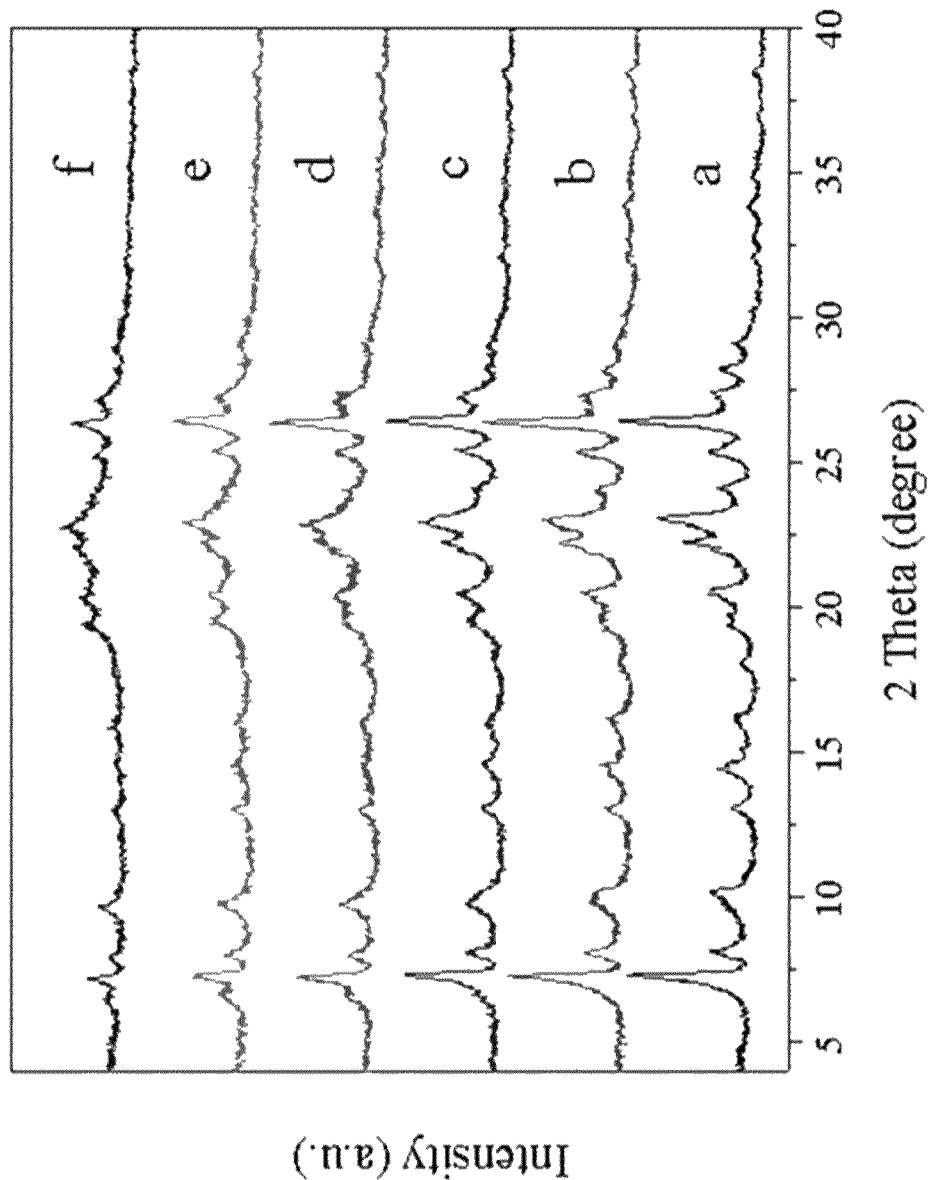
FIG. 6 shows the XRD patterns of the MWW zeolitic products synthesized with a $SiO_2/B_2O_3$ molar ratio of (a) 6.7, (b) 4.4, (c) 3.35, (d) 2.8, (e) 2.2, and (f) 1.9, according to Example 3. In the figure, the diffraction angle 2 theta in ° is shown along the abscissa and the intensities are plotted along the ordinate.

FIG. 6 shows the XRD patterns of the zeolitic products obtained with different $SiO_2$:$B_2O_3$ molar ratios in the gel precursor. It can be seen from the XDR patterns that the MWW zeolites prepared with a higher $SiO_2$:$B_2O_3$ molar ratio displays a higher crystallinity based on the reflection intensity. For the zeolite prepared with a lower $SiO_2$:$B_2O_3$ molar ratio, the reflection peaks associated with the MWW framework structure can still be resolved, but with a relatively less intensity.

More specifically, it may be taken from FIG. 6 that sample a therein (synthesized with a $SiO_2$/$B_2O_3$ ratio of 6.7) displays a high crystallinity in particular when compared to samples d-f prepared with low $SiO_2$:$B_2O_3$ molar ratios. Notably, said sample a is measured to have lattice parameter a of 13.986 Å, and lattice parameter c of 25.969 Angstrom, based on its XRD pattern of FIG. 6.

Example 4: Examining the Influence of the Organotemplate Content

Example 1 was repeated but with different CHA:SiO$_2$ molar ratios used for the gel precursor. CHA:SiO$_2$ molar ratios of 0.184, 0.294 and 0.514 were employed for the synthesis in order to investigate the effect of different CHA:SiO$_2$ molar ratios on the crystallinity of the zeolitic products.

Figure 7:
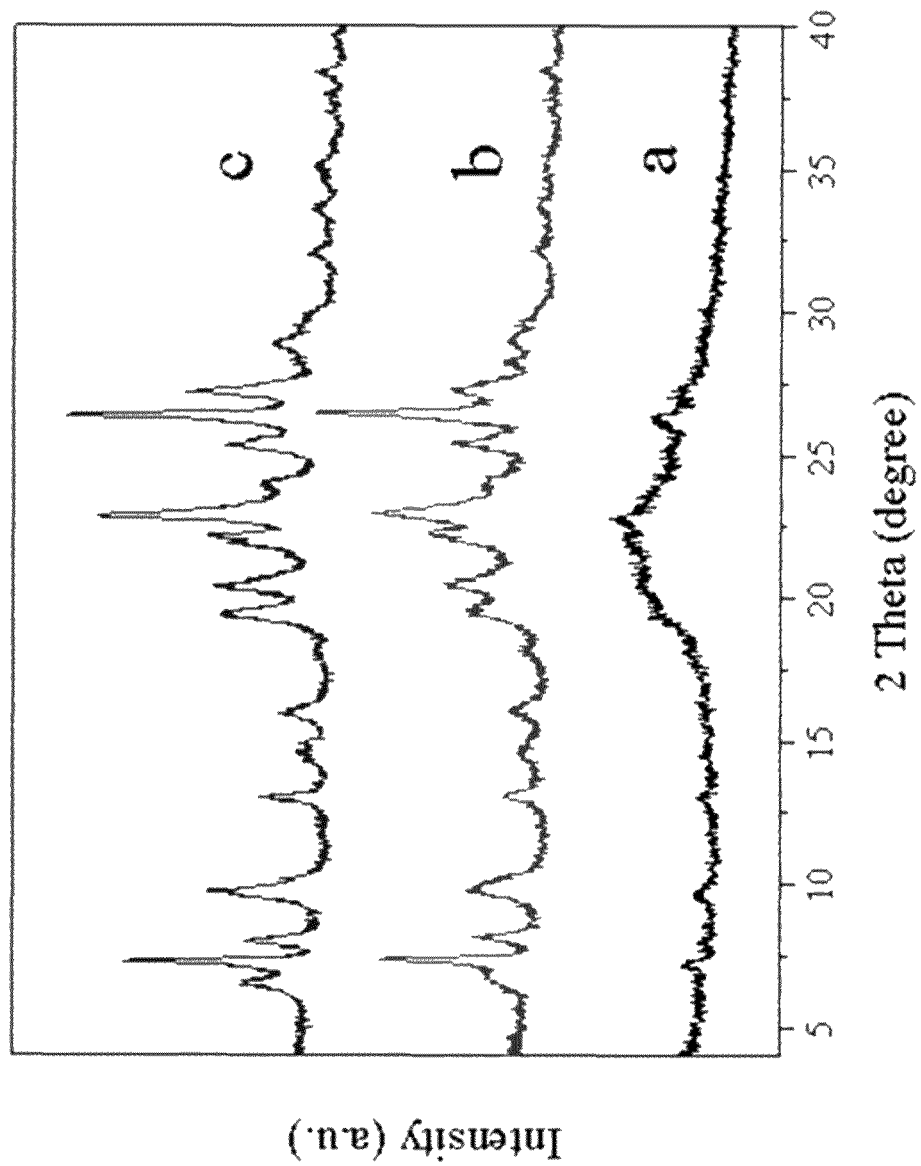
FIG. 7 shows the XRD patterns of the MWW zeolitic products synthesized with a $CHA/SiO_2$ molar ratio of (a) 0.184, (b) 0.294, and (c) 0.514, according to Example 4. In the figure, the diffraction angle 2 theta in ° is shown along the abscissa and the intensities are plotted along the ordinate.

FIG. 7 shows the XRD patterns of the zeolitic products obtained with different CHA:SiO$_2$ molar ratios in the gel precursor. It can be seen from the XRD patterns that the MWW zeolite prepared with a high CHA:SiO$_2$ molar ratios such as 0.514 and 0.294 displays a relatively high crystallinity based on the intensity of the reflection peaks. For the zeolite prepared with a relatively low CHA:SiO$_2$ molar ratio such as 0.184, the reflection peaks associated with the MWW framework structure can still be resolved, but with a relatively less intensity.

More specifically, it may be taken from FIG. 7 that sample c therein (synthesized with a CHA/SiO$_2$ ratio of 0.514) displays a high crystallinity when compared to the samples prepared with a lower CHA/SiO$_2$ ratio. Notably, said sample c is measured to have lattice parameter a of 14.056 Å, and lattice parameter c of 27.010 Å, based on its XRD pattern of FIG. 7.

Example 5: Examining the Influence of the Na$_2$O Content

Example 1 was repeated but with different Na$_2$O:SiO$_2$ molar ratios used for the gel precursor. Na$_2$O:SiO$_2$ molar ratios of 0.052, 0.105, 0.131, 0.166 and 0.219 were employed for the preparation in order to investigate the effect of different Na$_2$O:SiO$_2$ molar ratios on the crystallinity of the zeolitic products.

Figure 8:
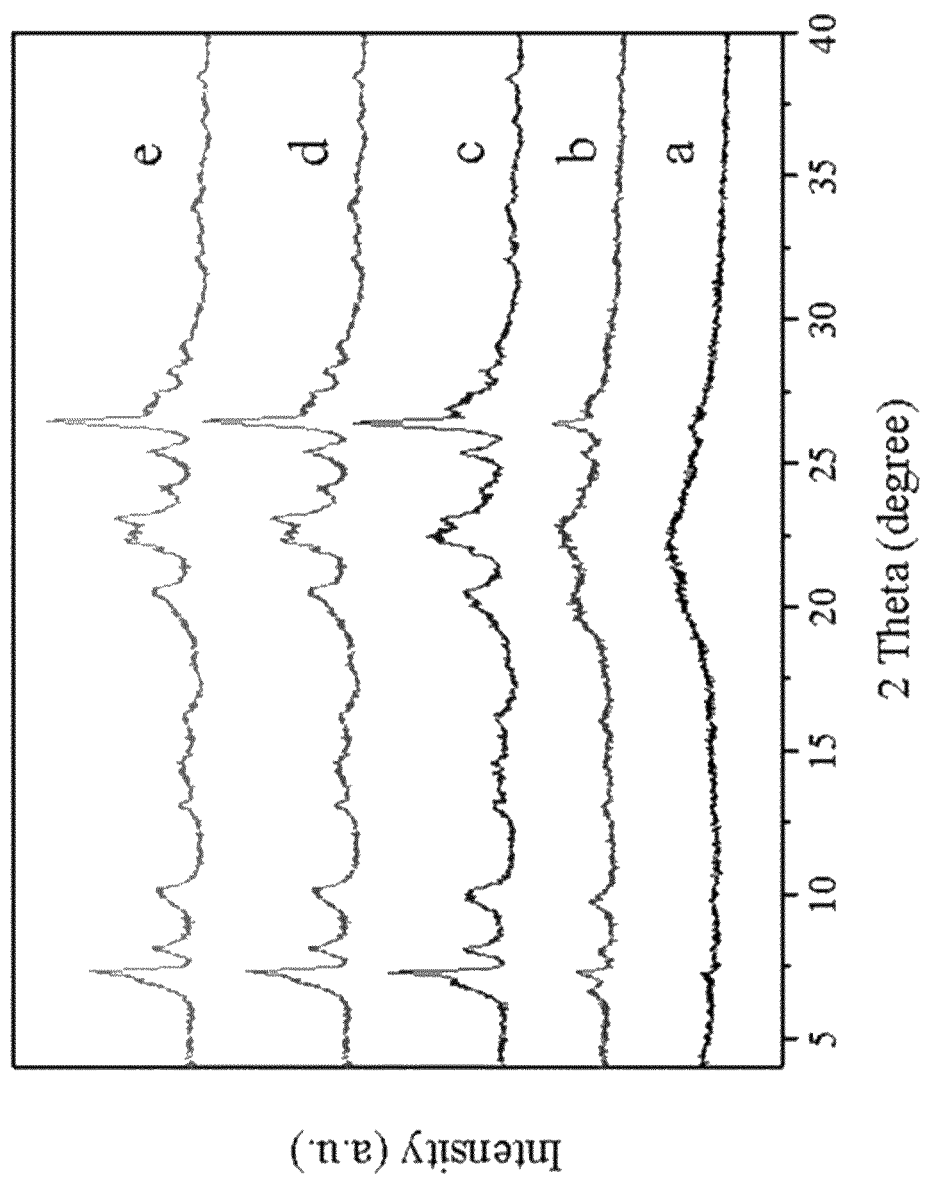
FIG. 8 shows the XRD patterns of the MWW zeolitic products synthesized with a $Na_2O/SiO_2$ molar ratio of (a) 0.052, (b) 0.105, (c) 0.131, (d) 0.166, and (e) 0.219, according to Example 5. In the figure, the diffraction angle 2 theta in ° is shown along the abscissa and the intensities are plotted along the ordinate.

FIG. 8 shows the XRD patterns of the zeolitic products obtained with different Na$_2$O:SiO$_2$ molar ratios in the gel precursor. It can be seen from the XRD patterns that the MWW zeolite prepared with a high Na$_2$O:SiO$_2$ molar ratios such as 0.514 and 0.294 displays a relatively high crystallinity based on the intensity of the reflection peaks. For the zeolite prepared with a relatively low Na$_2$O:SiO$_2$ molar ratio such as 0.052, the intensity of the reflections peaks associated with the MWW framework structure is significantly decreased.

More specifically, it may be taken from FIG. 8 that sample e therein (synthesized with a Na$_2$O/SiO$_2$ ratio of 0.219) displays a high crystallinity in particular when compared to samples a and b prepared with lower Na$_2$O/SiO$_2$ ratios. Notably, said sample e is measured to have lattice parameter a of 14.072 Å, and lattice parameter c of 26.077 Å, based on the XRD pattern of FIG. 8.

Example 6: Examining the Influence of the Seed Content

Example 1 was repeated but with different contents of Al-MWW precursors in the gel precursor. 0 weight-%, 2.5 weight-%, 5 weight-% and 10 weight-% of Al-MWW precursors with respect to the SiO$_2$ source of the colloidal silica were used for the samples in order to investigate the effect of seed contents on the crystallinity of the zeolitic products.

Figure 9:
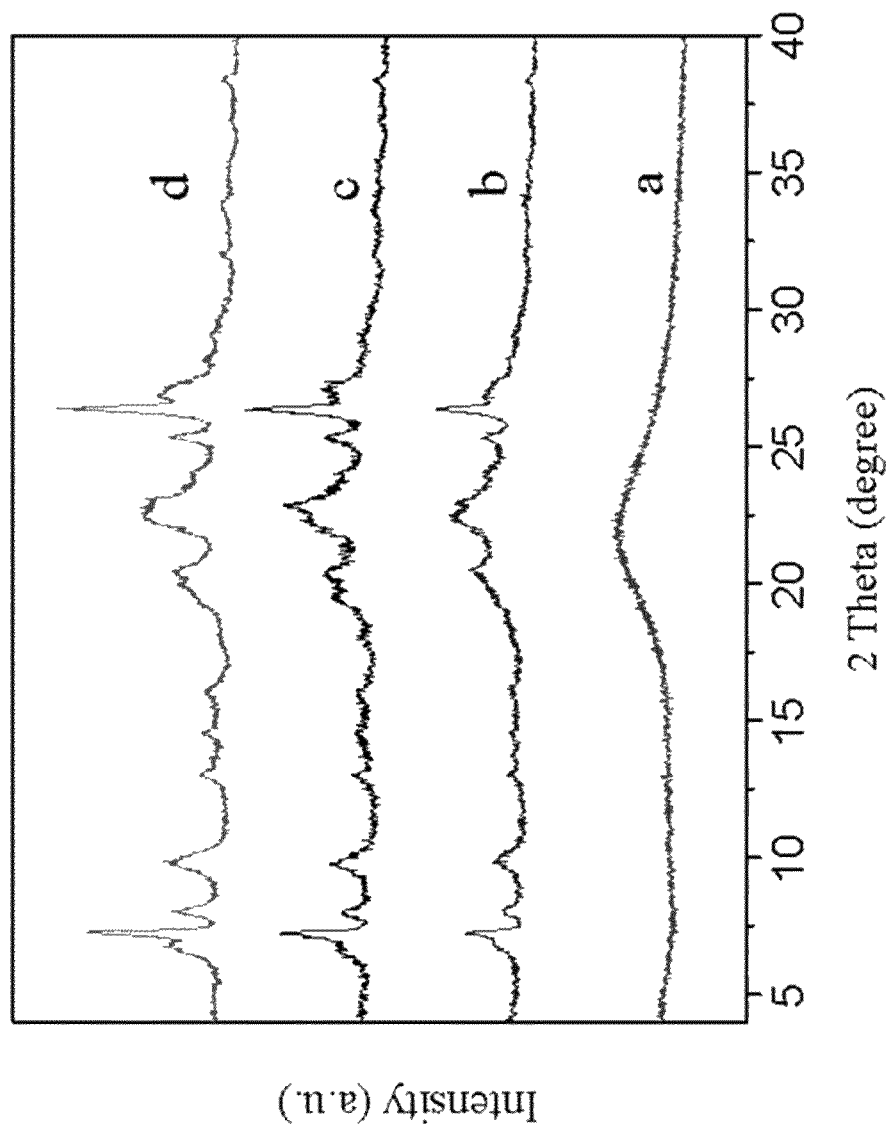
FIG. 9 shows the XRD patterns of the products synthesized with a seed content of (a) 0 weight-%, (b) 2.5 weight-%, (c) 5 weight-%, and (d) 10 weight-%, according to Example 6. In the figure, the diffraction angle 2 theta in ° is shown along the abscissa and the intensities are plotted along the ordinate.

FIG. 9 shows the XRD patterns of the products obtained with different seed contents in the gel precursor. It can be seen from the XDR patterns that the zeolite prepared with a high seed contents such as 5 weight-% and 10 weight-% displays a relatively high crystallinity based on the intensity of the reflection peaks. For the synthesis in the absence of seeds, the obtained product is amorphous, as demonstrated by the XRD pattern of sample a with 0 weight-% seeds in FIG. 9.

Example 7: Preparation of B-MWW Using the Al-MWW Zeolite as Seed Crystals

Example 1 was repeated but by using the calcined Al-MWW zeolite as seed crystals (obtained from Reference Example 1). Since the Al-MWW seed crystals have been calcined under high temperatures, no additional organotemplate is introduced from the seed crystals, as supported by the very low carbon content of the seed crystals measured by the elemental analysis (see Reference Example 1).

Figure 10:
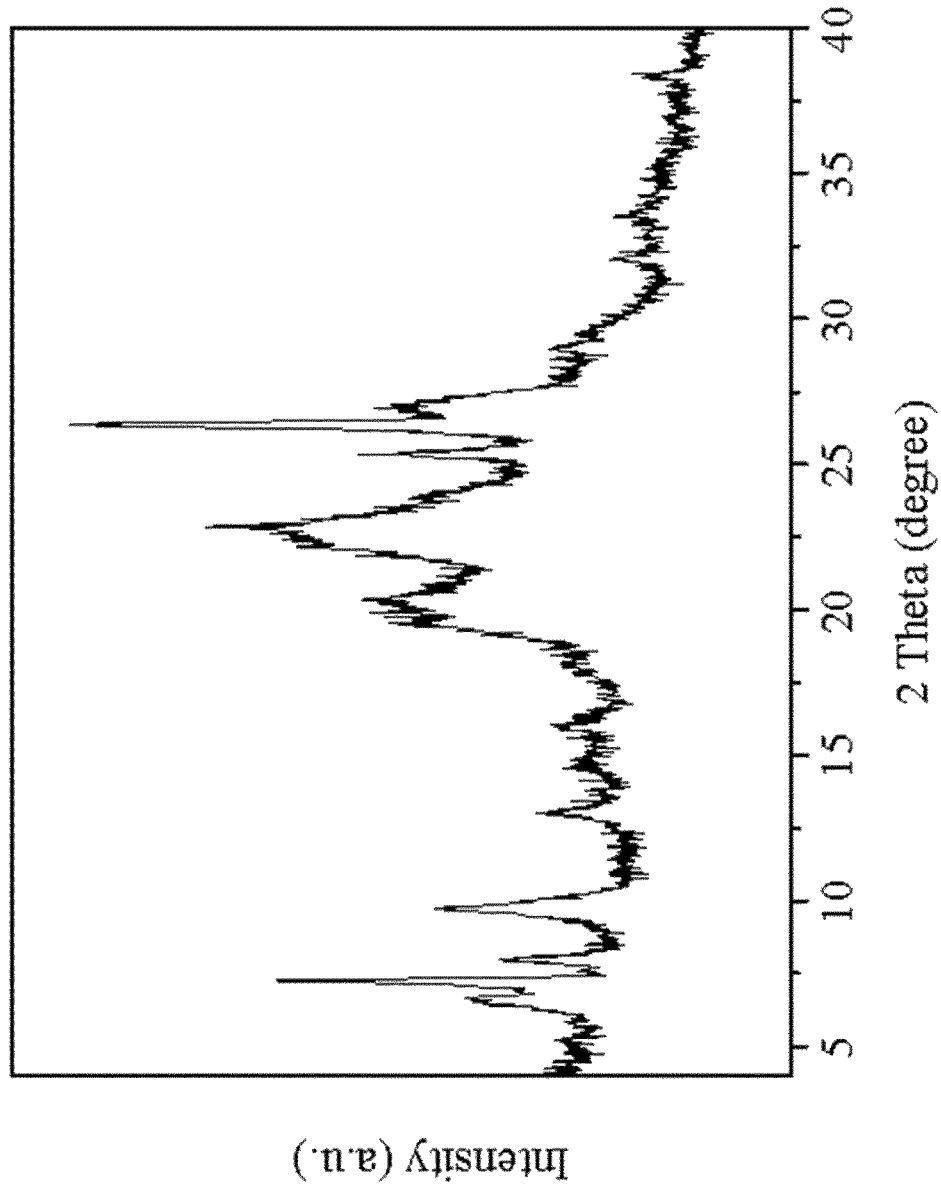
FIG. 10 shows the XRD pattern of the MWW zeolitic product obtained in Example 7. In the figure, the diffraction angle 2 theta in ° is shown along the abscissa and the intensities are plotted along the ordinate.

FIG. 10 shows the XRD pattern of the obtained product, from which it is apparent that said product has an MWW framework structure.

Example 8: Preparation of B-MWW Using the Uncalcined B-MWW Precursor as Seed Crystals 0.18 g of NaOH and 0.6 g of H$_3$BO$_3$ were dissolved in 9.9 g of deionized water. To this solution, 0.7 g of cyclohexylamine was added, and followed by a stirring of 30 min. Subsequently, 0.824 g of fine silica (fine-pored Silica Gel, from Qingdao Haiyang Chemical, China) was added to the solution, and stirring was continued for 4 h at ambient temperature. The obtained gel has a molar composition of 0.157 Na$_2$O:SiO$_2$:0.354B$_2$O$_3$:41 H$_2$O: 0.514 CHA. 0.04 g of (uncalcined) B-MWW layered precursor obtained from Example 1 (5 weight-% relative to SiO$_2$ in the react on mixture) was then added as seed crystals into said gel, followed by a stirring of another 10 min. The mixture was transferred into a Teflon-lined autoclave and crystallized at 150° C. 3 for 5 days under a rotating speed of 50 rpm. Finally, the crystallized product was filtrated, washed with deionized water, dried at 100° C. for 4 h, thus affording the layered precursor of B-MWW.

Figure 11:
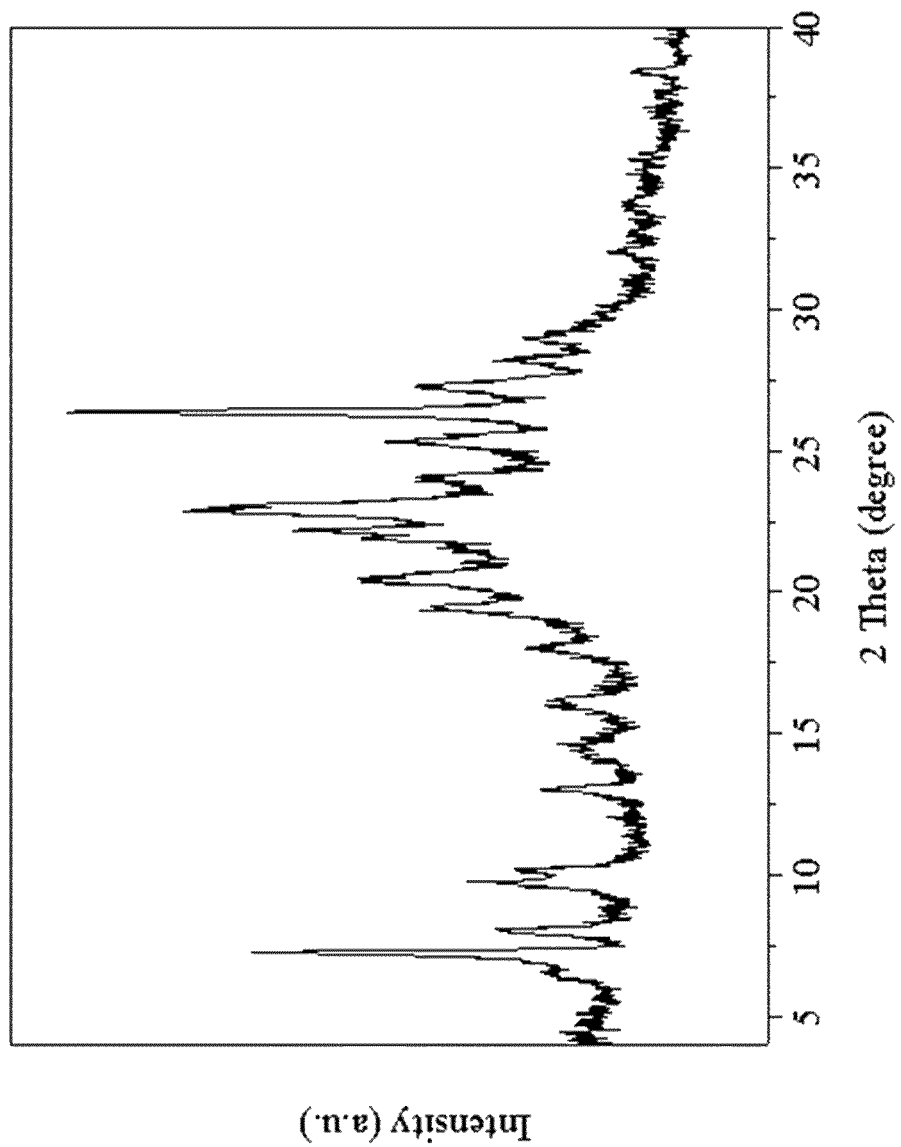
FIG. 11 shows the XRD pattern of the MWW zeolitic product obtained in Example 8. In the figure, the diffraction angle 2 theta in ° is shown along the abscissa and the intensities are plotted along the ordinate.

FIG. 11 shows the XRD pattern of the product after calcination thereof, from which the typical pattern of the MWW framework structure is apparent.

Example 9: Preparation of B-MWW Using Li as the Alkali Metal

Example 1 was repeated but using Li as the alkali metal in the synthetic gel having a molar composition of 0.156 Li$_2$O:1 SiO$_2$:0.22B$_2$O$_3$:40:H$_2$O:0.33 CHA, to which 5 weight-% of Al-MWW layered precursor relative SiO$_2$ of the gel was added. The obtained zeolitic product is characterized by a typical MWW framework structure, as measured by the XRD. Therefore, Li can also be used as the alkali metal for the synthesis of B-MWW zeolitic materials.

Comparative Example 1: Examining the Influence of Seed Crystals and Organotemplate Example 1 was repeated but using a molar composition of 0.131 Na$_2$O:1 SiO$_2$:0.354B$_2$O$_3$: 41 H$_2$O:0.514 CHA for the synthetic gel, to which 5 weight-% of Al-MWW layered precursor relative to SiO$_2$ of the get was added. FIG. 12(a) shows the XRD pattern of the obtained zeolitic product, from which it is apparent that said product has a MWW framework structure.

The above synthesis was repeated without adding seed crystals, or without adding the organotemplate CHA. Accordingly, FIGS. 12(b) and 12(c) show the XRD patterns of the final products obtained without seed crystals and without the organotemplate CHA, respectively, it may be taken from FIGS. 12(b) and 12(c) that both products are amorphous.

Figure 12:
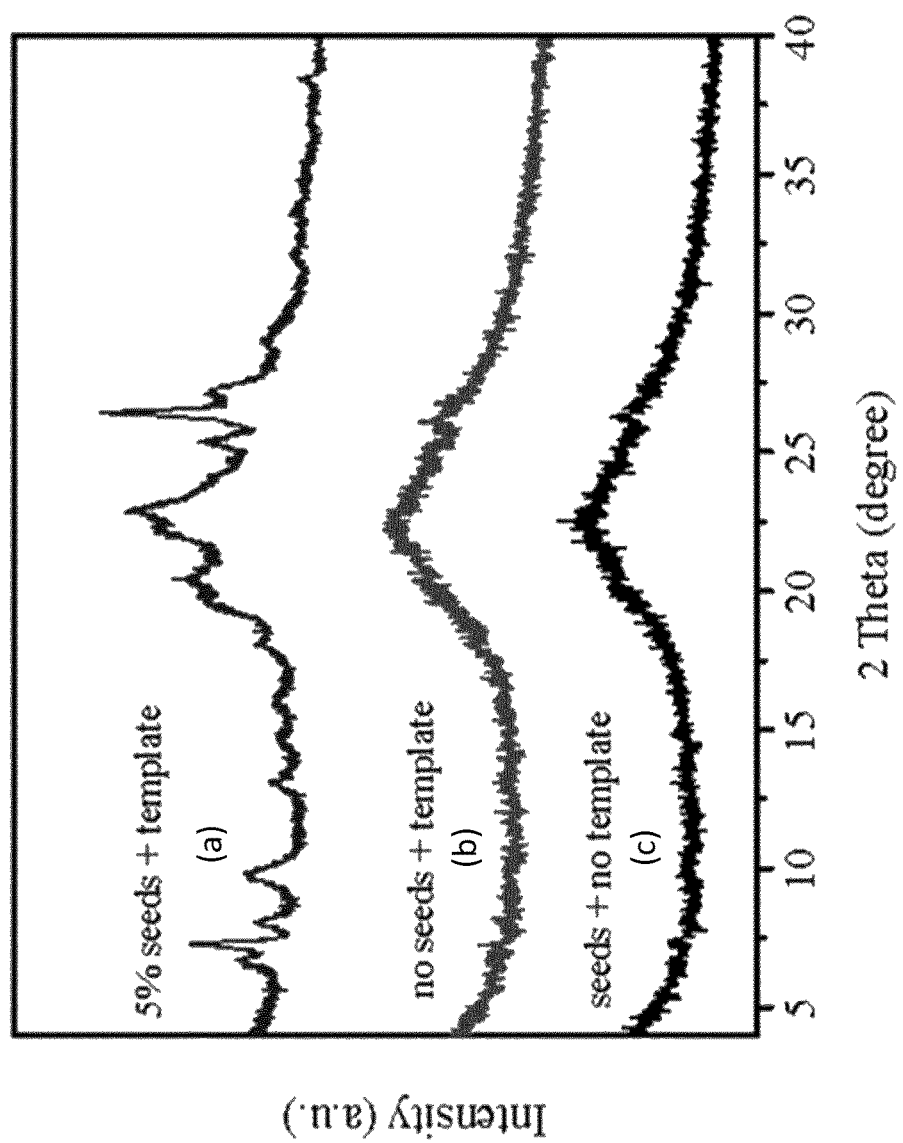
FIG. 12 shows the XRD patterns of the three products obtained in Comparative Example 1. Specifically, FIG. 12(a) (top) is the XRD pattern of the product obtained with seed crystals and the organotemplate CHA.

A comparison of the XRD results of FIG. 12 shows that the use of a combination of seed crystals and the organotemplate is essential for the successful synthesis of the B-MWW zeolitic product. Therefore, the use of seed crystals but without the organotemplate, as well as the use of the organotemplate but without seed crystals, does not lead to the formation of the MWW zeolitic product.

The invention claimed is:

1. A process for producing a boron-containing zeolitic material having an MWW framework structure, the process comprising:
    (a) crystallizing a mixture comprising one or more sources for $YO_2$ where Y is a tetravalent element, one or more sources for $B_2O_3$, one or more organotemplates represented by formula (I) as the only organotemplates, and one or more seed crystals to obtain a layered precursor of the boron-containing zeolitic material having an MWW framework structure:

$$R^1R^2R^3N \qquad \text{formula (I)}$$

where $R^1$ is a $(C_5\text{-}C_8)$cycloalkyl, and $R^2$ and $R^3$ are independently from each other H or an alkyl; and
    (b) calcining the layered precursor to obtain the boron-containing zeolitic material having an MWW framework structure comprising $YO_2$ and $B_2O_3$.

2. The process of claim 1, wherein the one or more seed crystals comprise $YO_2$ and $X_2O_3$, where X is at least one trivalent element selected from the group consisting of Al, B, In, and Ga.

3. The process of claim 1, wherein Y is at least one selected from the group consisting of Si, Sn, Ti, Zr, and Ge.

4. The process of claim 1, wherein
Y is Si, and
the one or more sources for $YO_2$ are at least one selected from the group consisting of a silica, a silicate, and silicic acid.

5. The process of claim 1, wherein the one or more sources for $B_2O_3$ are at least one selected from the group consisting of boric acid, boron oxide, a borate, and a borate ester.

6. The process of claim 1, wherein a molar ratio $YO_2$:$B_2O_3$ of the one or more sources of $YO_2$ to the one or more sources for $B_2O_3$ in the mixture ranges from 1:1 to 300:1.

7. The process of claim 1, wherein the one or more organotemplates are at least one selected from the group consisting of a substituted $(C_5\text{-}C_8)$cycloalkylamine and an unsubstituted $(C_5\text{-}C_8)$cycloalkylamine.

8. The process of claim 1, wherein an amount of the one or more seed crystals in the mixture ranges from 0.05 to 80 weight-% based on 100 weight-% of $YO_2$ in the one or more sources for $YO_2$.

9. The process of claim 1, wherein the crystallizing (a) is conducted under a solvothermal condition.

10. The process of claim 1, further comprising: after the crystallizing (a) and before the calcining (b),
    (i) isolating the layered precursor obtained in (a);
    (ii) optionally washing the layered precursor obtained in (i); and
    (iii) optionally drying the layered precursor obtained in (i) or (ii).

11. The process of claim 1, wherein the calcining (b) is carried out at a temperature of from 300 to 900° C.

12. The process of claim 1, further comprising: after the calcining (b),
    (iv) deboronating the boron-containing zeolitic material having an MWW framework structure obtained in (b) with a liquid solvent system, thereby obtaining a deboronated zeolitic material having an MWW framework structure.

13. The process of claim 1, wherein the one or more seed crystals comprise a zeolitic material having an MWW framework structure and/or a layered precursor of a zeolitic material having an MWW framework structure.

14. The process of claim 1, wherein in the formula (I), both $R^2$ and $R^3$ are H.

* * * * *

UNITED STATES PATENT AND TRADEMARK OFFICE
CERTIFICATE OF CORRECTION

PATENT NO. : 10,196,276 B2
APPLICATION NO. : 15/316220
DATED : February 5, 2019
INVENTOR(S) : Stefan Maurer et al.

It is certified that error appears in the above-identified patent and that said Letters Patent is hereby corrected as shown below:

In the Specification

Column 1, Line 11, "Jo material" should read "material"

Column 9, Line 51, "1: 4-20)" should read "1 : (4-20)"

Column 10, Line 13, "the the" should read "the"

Column 11, Line 30, "Jo More" should read "More"

Column 13, Line 32, "the a" should read "the"

Column 19, Line 44, "ordinate" should read "ordinate."

Signed and Sealed this
Seventeenth Day of March, 2020

Andrei Iancu
*Director of the United States Patent and Trademark Office*